Inventors
Frank E. Stratton
Philip R. Scott
By their Attorney

Inventors
Frank E. Stratton
Philip R. Scott
By their Attorney

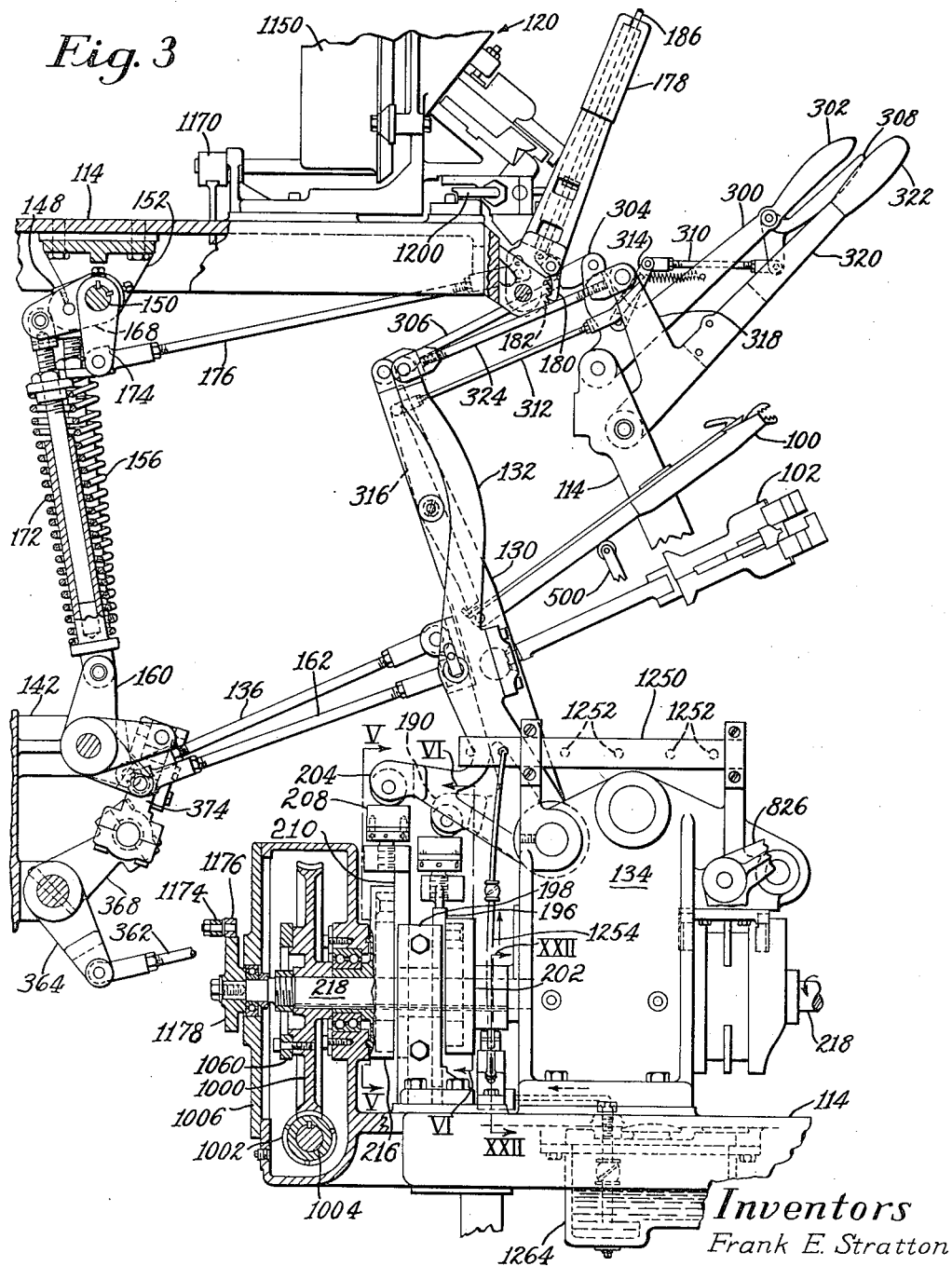

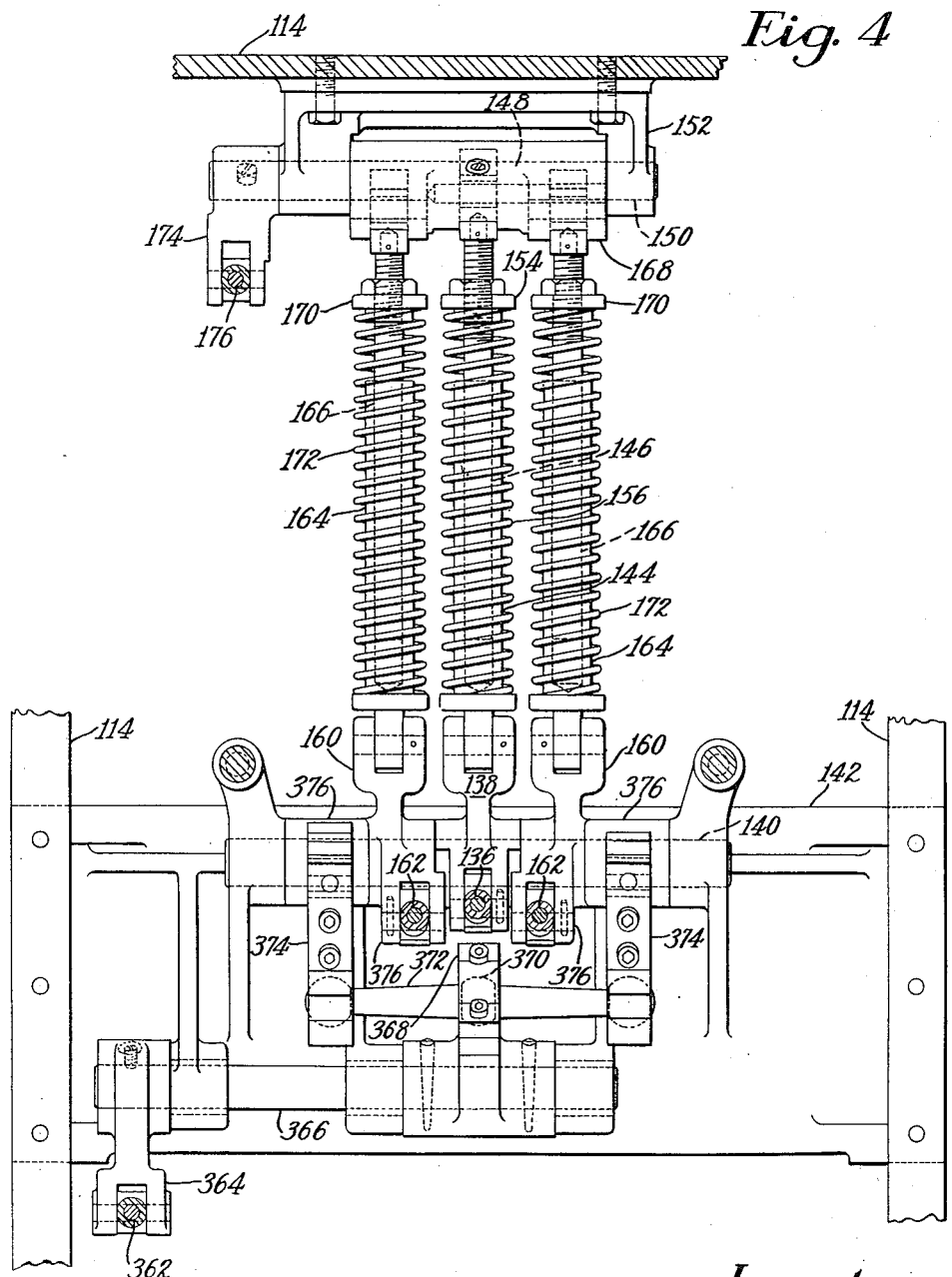

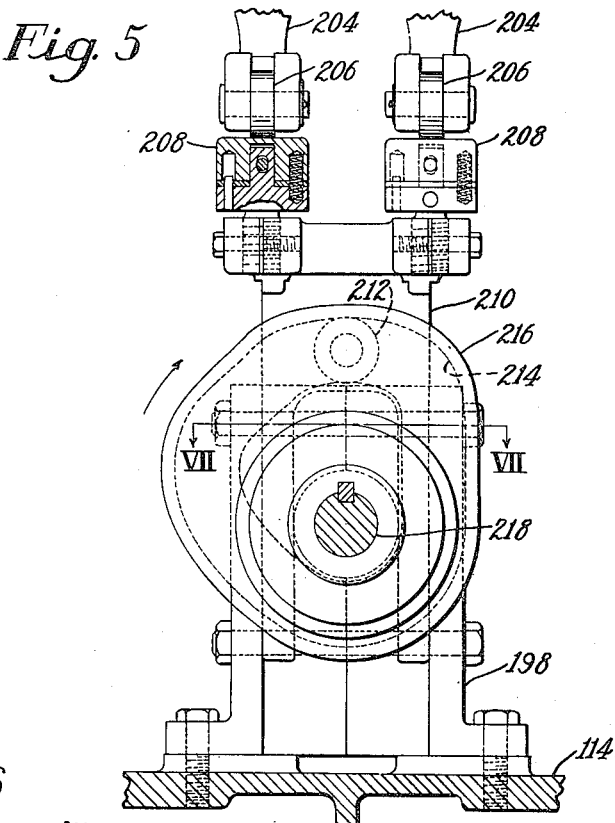
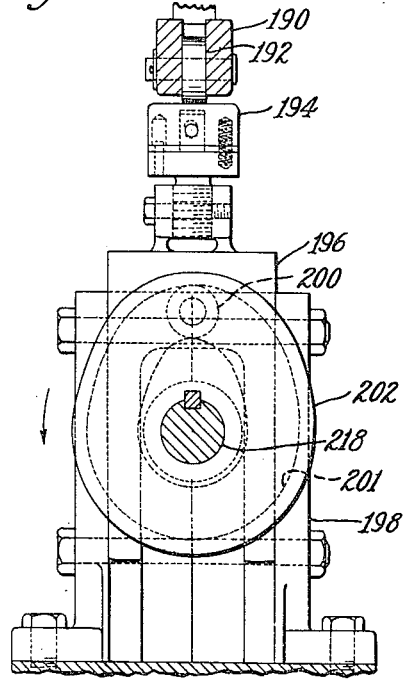
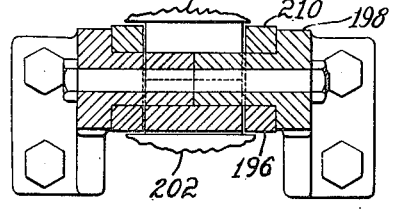

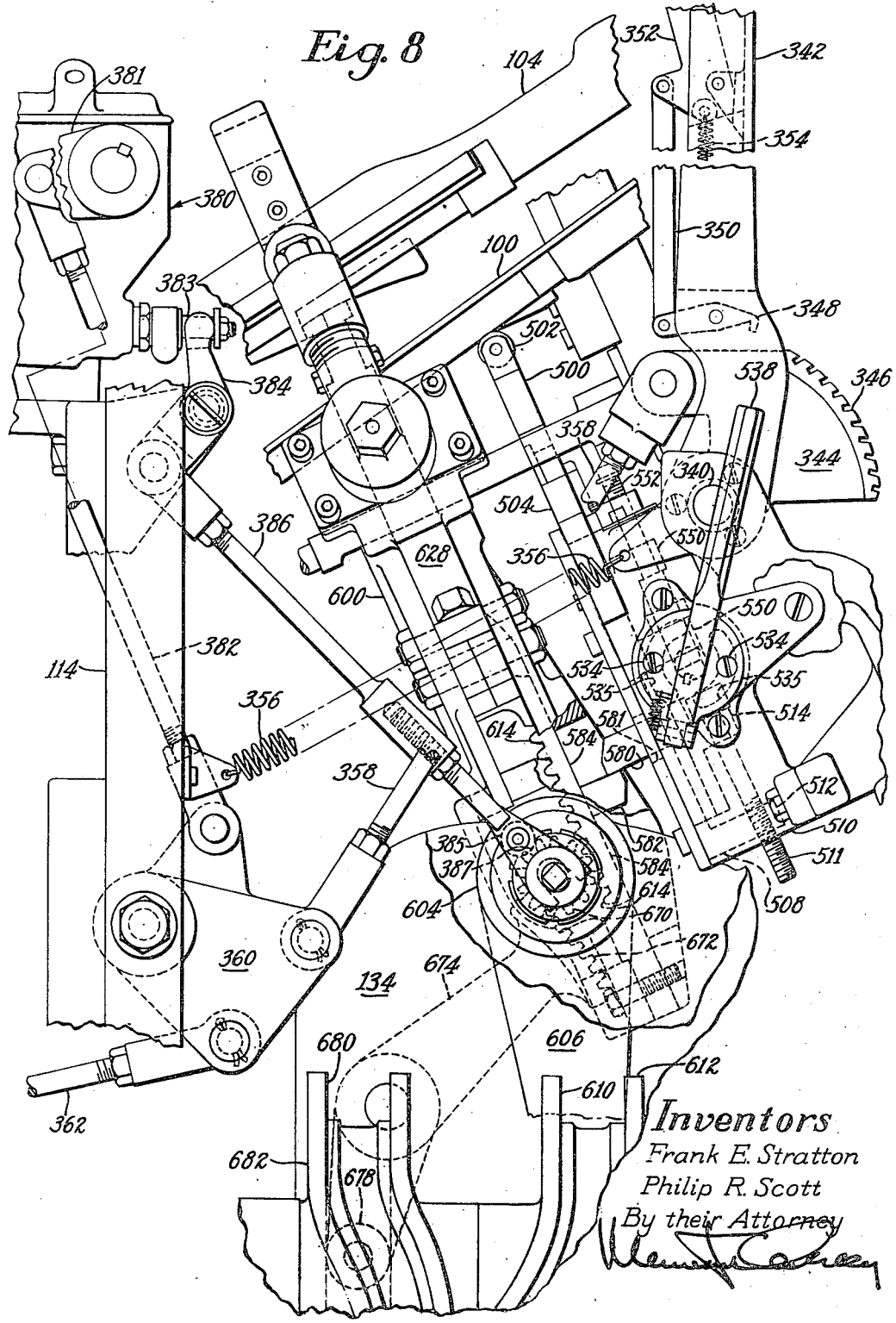

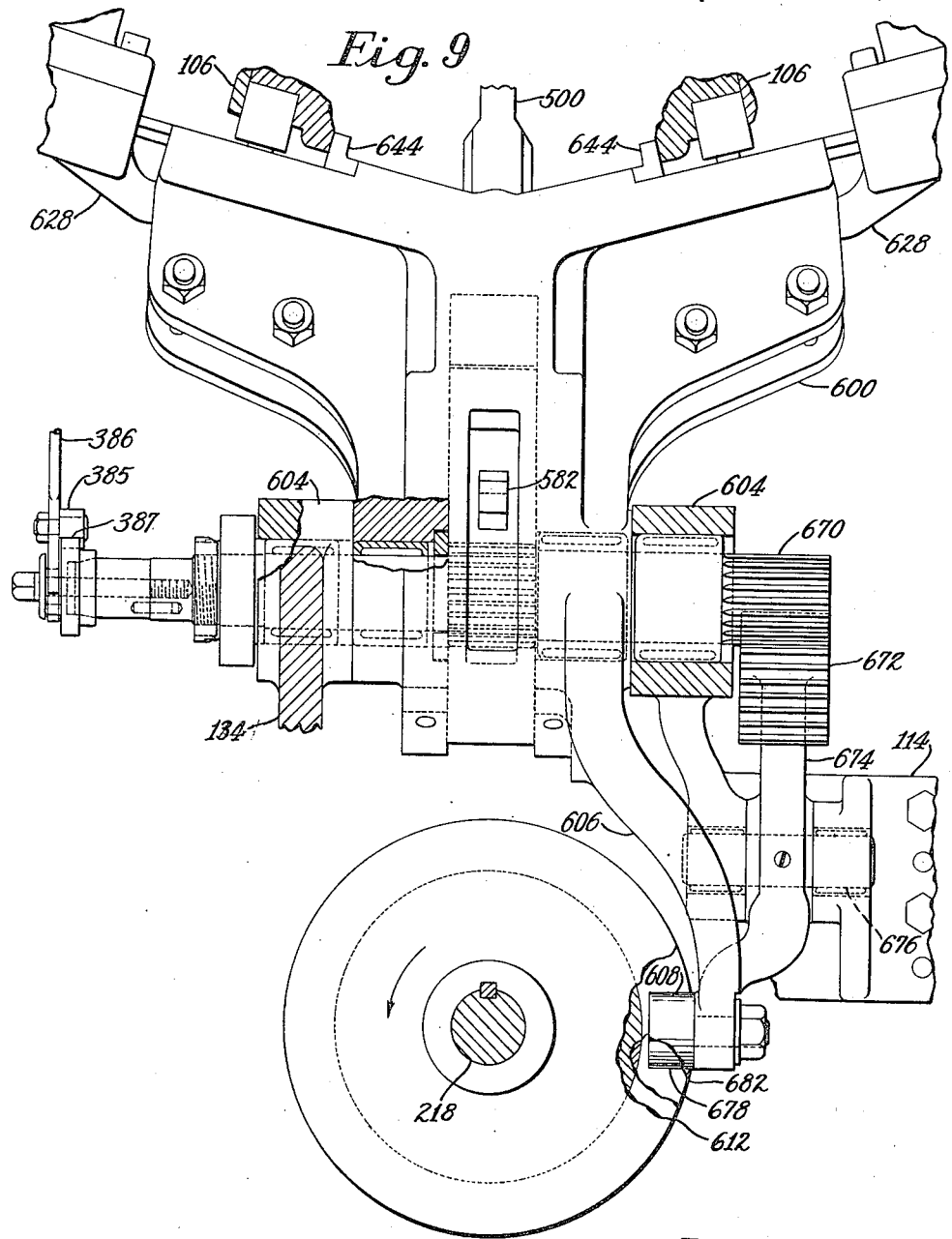
Fig. 9
Inventors
Frank E. Stratton
Philip R. Scott
By their Attorney

Aug. 14, 1956     F. E. STRATTON ET AL     2,758,324
MACHINES FOR SHAPING UPPERS OVER LASTS
Filed May 13, 1953     17 Sheets-Sheet 10
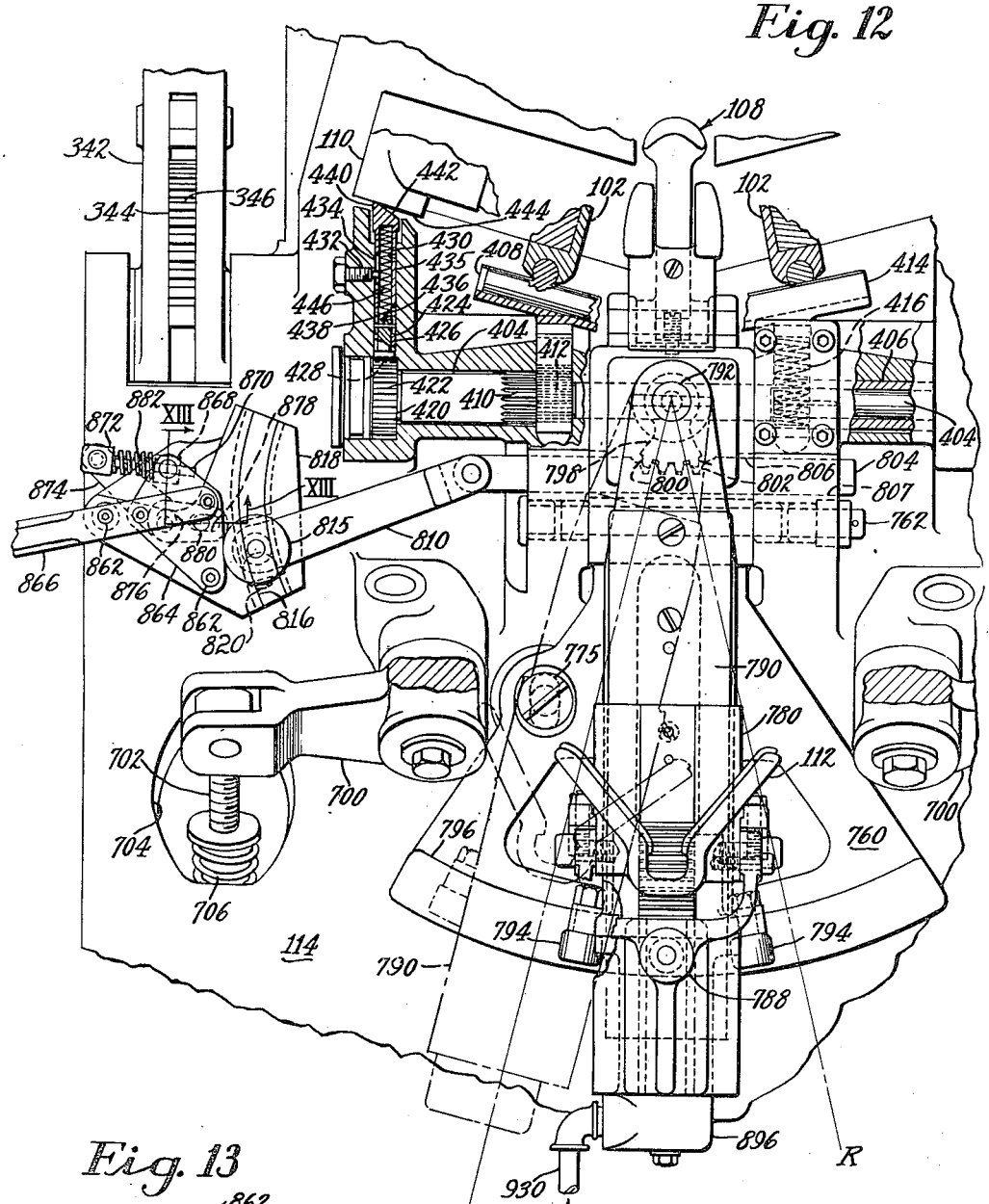
*Fig. 12*
*Fig. 13*
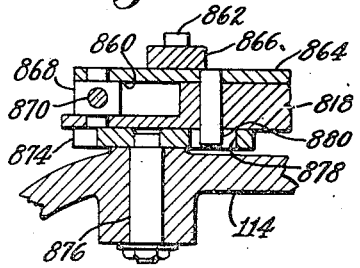
*Inventors*
Frank E. Stratton
Philip R. Scott
By their Attorney Aug. 14, 1956　　F. E. STRATTON ET AL　　2,758,324
MACHINES FOR SHAPING UPPERS OVER LASTS
Filed May 13, 1953　　　　　　　　　　　　17 Sheets-Sheet 11

*Inventors*
Frank E. Stratton
Philip R. Scott
By their Attorney

Aug. 14, 1956   F. E. STRATTON ET AL   2,758,324
MACHINES FOR SHAPING UPPERS OVER LASTS
Filed May 13, 1953   17 Sheets-Sheet 12

Inventors
Frank E. Stratton
Philip R. Scott
By their Attorney

Aug. 14, 1956 F. E. STRATTON ET AL 2,758,324
MACHINES FOR SHAPING UPPERS OVER LASTS
Filed May 13, 1953 17 Sheets-Sheet 13

Inventors
Frank E. Stratton
Philip R. Scott
By their Attorney

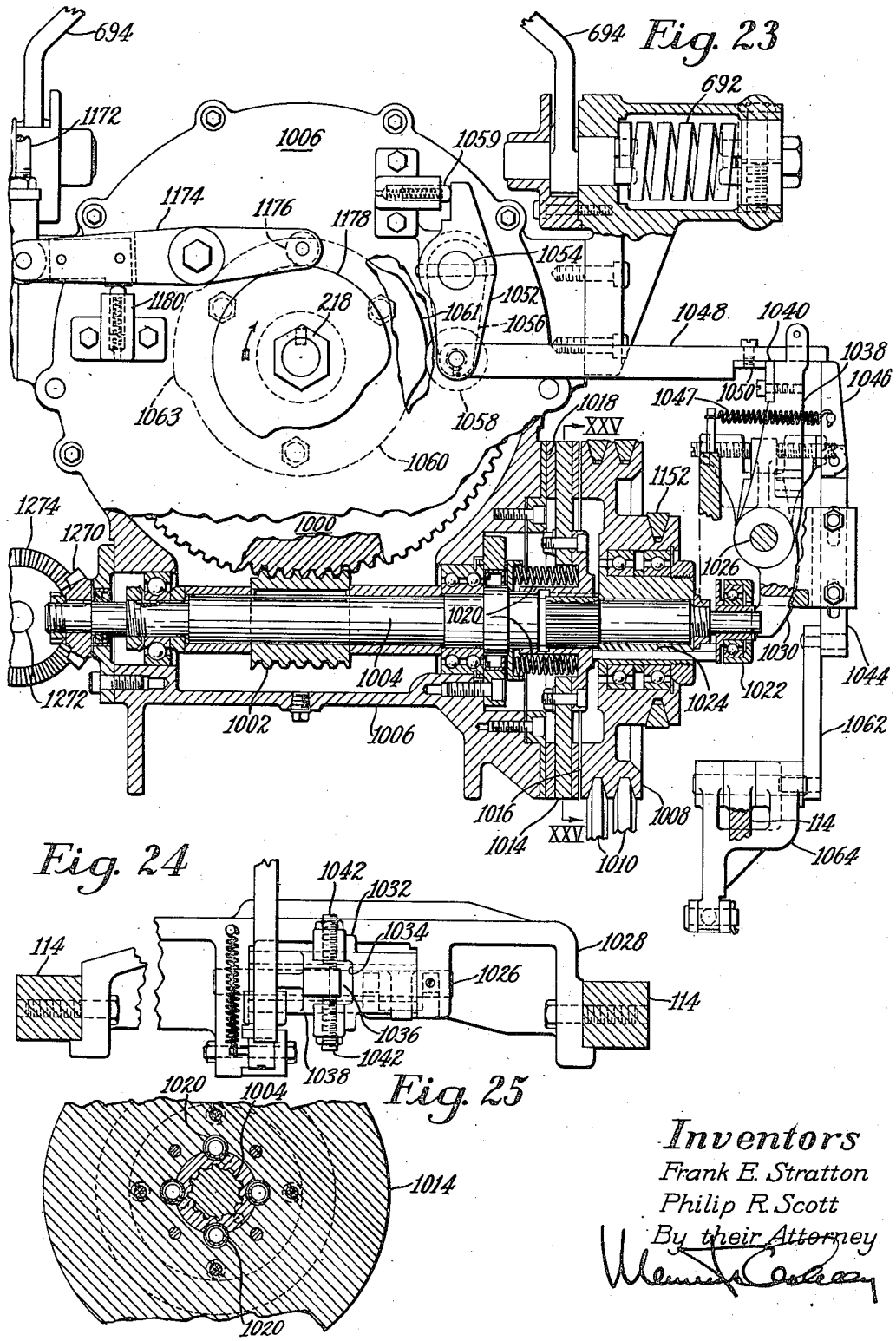

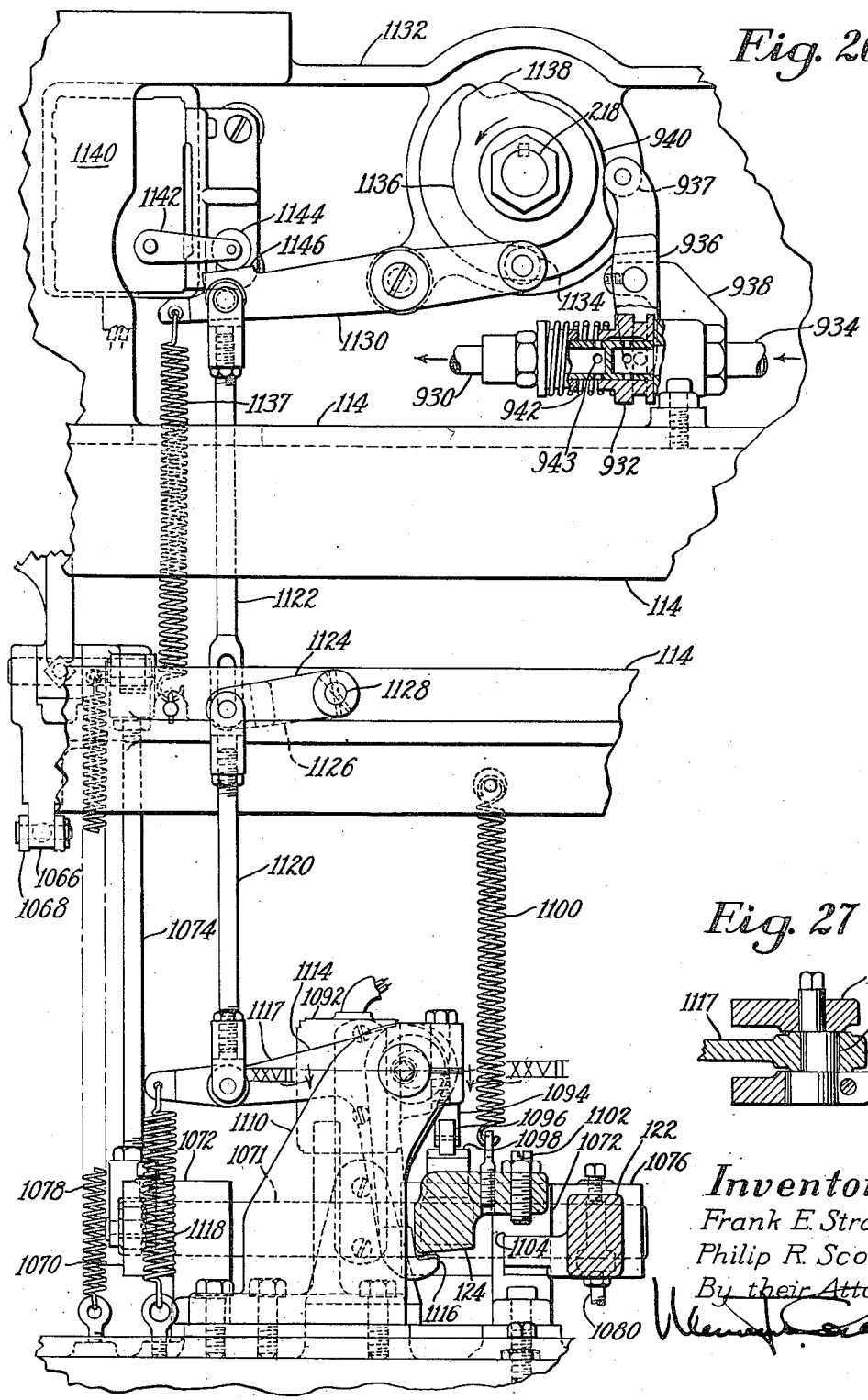

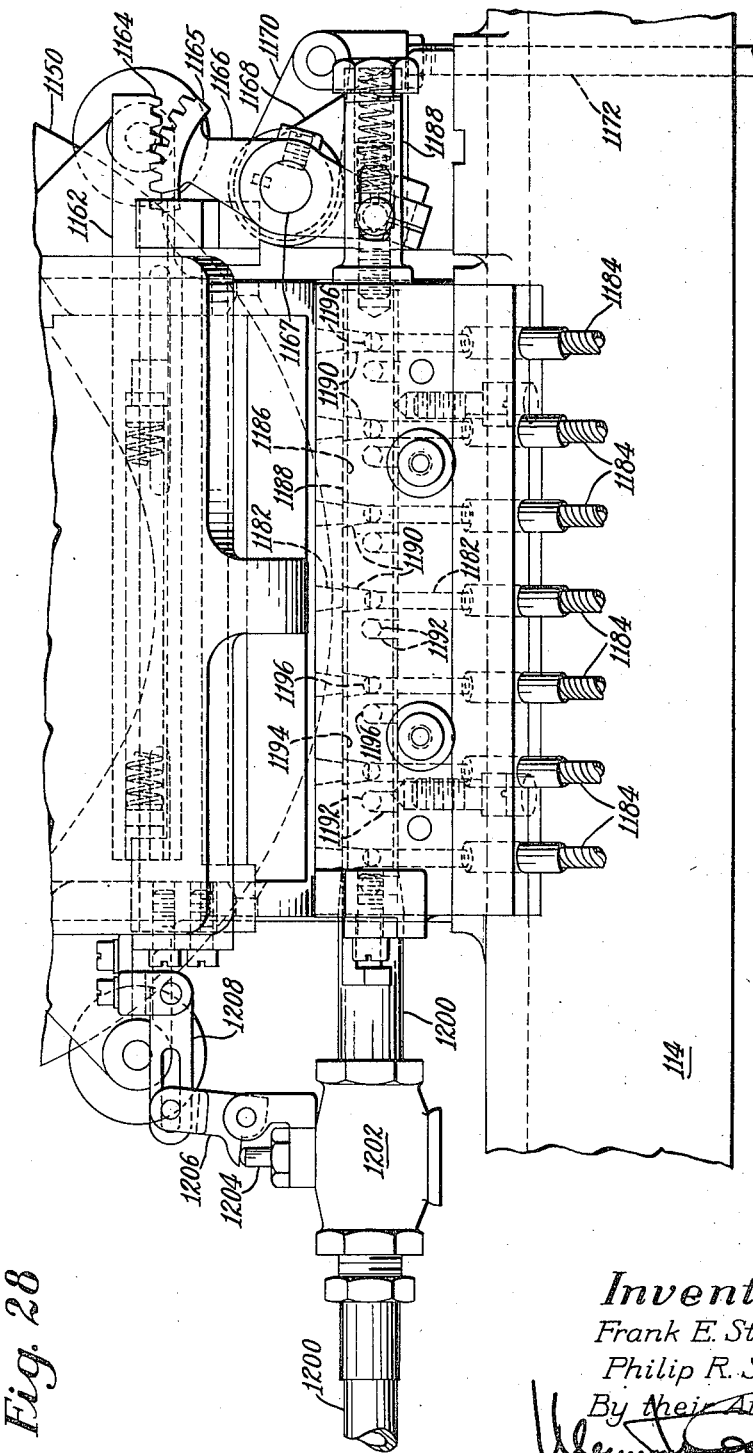

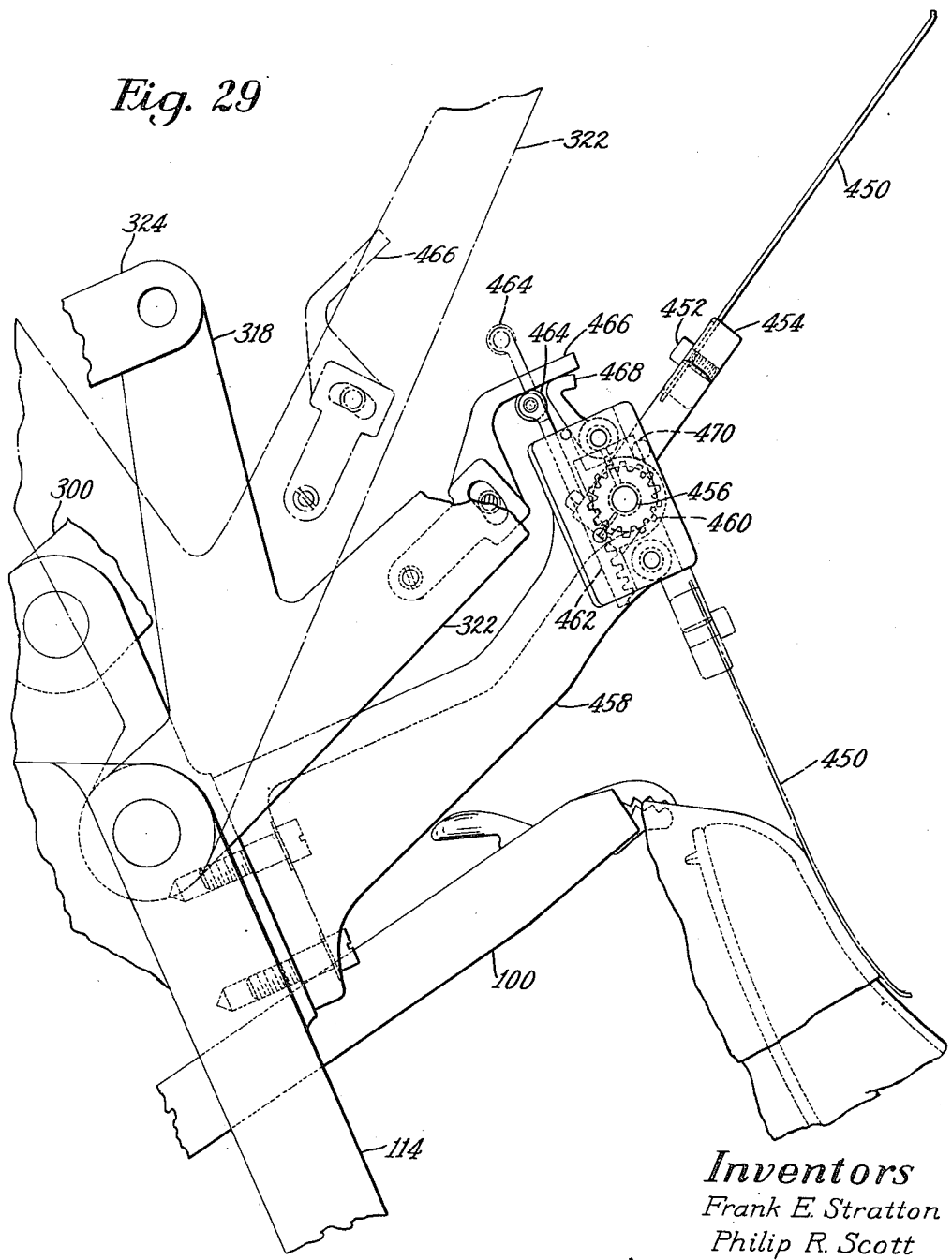

United States Patent Office 2,758,324
Patented Aug. 14, 1956

2,758,324

MACHINES FOR SHAPING UPPERS OVER LASTS

Frank E. Stratton and Philip R. Scott, Beverly, Mass., assignors to United Shoe Machinery Corporation, Flemington, N. J., a corporation of New Jersey Application May 13, 1953, Serial No. 354,856

54 Claims. (Cl. 12—10.4)

This invention relates to machines for shaping uppers over lasts, and is herein illustrated as embodied in a pulling-over machine of the so-called "inverted" type in which the grippers are arranged to exert a downward pull on the upper of a shoe on a last presented to the machine with its toe end uppermost and inclined rearwardly away from the operator. It will be understood, however, that various features of this invention are not limited in utility to embodiment in a pulling-over machine of this particular type or to use in a machine of the exact mechanical construction herein shown.

A principal object of the invention is to provide a pulling-over machine of the "inverted" type which is easier and safer to operate than previous machines, is of relatively simple construction and at the same time is dependable in operation and capable of handling a wide variety of shoes of different sizes on lasts of different styles. While the herein illustrated machine in many respects is generally similar to the pulling-over machine disclosed in United States Letters Patent No. 1,029,387, issued on July 11, 1912 in the name of Ronald F. McFeely, it differs materially therefrom in many respects to be mentioned below and in accordance with the various features of this invention.

In common with prior pulling-over machines, the herein illustrated machine has a toe gripper and a pair of side grippers, these grippers being arranged to seize and to exert downwardly directed tensioning pulls on the upper of a shoe respectively at the toe end and at the opposite sides of a last supported in the machine with its toe end pointed upwardly and inclined rearwardly away from the operator. These grippers are each connected to an operating lever frequently called an "updraw" lever, and these levers are each actuated by means of a spring, sometimes called an "updraw" spring, these three springs being operatively connected to the gripper-operating levers and tending at all times to swing these levers in a direction to cause the grippers to exert their pull. Such movements of the gripper-operating levers are, however, controlled by a pair of cams associated with a main drive shaft and arranged, during a cycle of power operations of the machine, to release the gripper-operating levers to the actions of their associated springs and thereafter to return the gripper-operating levers and grippers to their original positions.

With the view of facilitating the simultaneous adjustment of the three gripper-operating springs they are all mounted on a common support and manually operable means is provided for changing the position of this support to vary the tension of the three springs. Preferably, and in the herein illustrated machine, this common support comprises a bell-crank lever having three arms to which the three springs are respectively connected and a fourth arm which is connected to a hand lever conveniently located on the frame of the machine and provided with a locking device for holding it in different angular positions. In order that the variation in the tension of the toe gripper spring will be less than that of the two side gripper springs for a given angular displacement of the hand lever, the arm of the bell-crank lever to which the toe gripper spring is connected is considerably shorter than the two arms to which the side gripper springs are connected. Each of the gripper-operating springs is connected to its associated gripper-operating lever by means including a bell-crank lever pivotally mounted on a fixed part of the machine frame. During the operation of the grippers these springs expand and as a result the forces they exert correspondingly decrease. In order to offset this effect and to provide for a substantially uniform force of pull throughout the entire range of movement of the grippers the arms of the aforementioned bell-crank lever are so disposed angularly to the lines of action of their associated springs and to the direction of movement of the grippers connected thereto that the mechanical advantage of the bell-crank levers increases as the tension of the springs decreases.

As is common in pulling-over machines, the main drive shaft is arranged to be brought to a stop at an intermediate point in the cycle of operations of the machine with the toe gripper and side grippers holding the upper under tension. During this so-called "dwell" or "inspection" period, the operator inspects the upper to see if it is properly located and pulled over the last and if it is not he corrects the situation by certain manual manipulations of the toe and/or side grippers. Thus he may increase the pull on the toe gripper or on one or both of the side grippers by manual movement of the gripper-operating levers. In prior machines, for example of the type disclosed in the aforementioned McFeely patent, this has been done by seizing the particular operating lever and moving it bodily. However, this necessarily involves a considerable manual effort on the part of the operator. In order to facilitate such manual manipulation of the grippers, the herein illustrated machine is provided with three bell-crank levers, mounted in a convenient location on the frame of the machine and operatively connected, respectively, with the toe gripper and the two side grippers. Each of these bell-crank levers has one relatively long arm providing an operating handle to be grasped by the operator and another shorter arm which is connected to its associated gripper-operating lever at the end of this lever opposite to that on which the lever is fulcrumed. In this manner a very considerable mechanical advantage is provided which makes it relatively easy for the operator to manipulate one or all of the grippers as desired.

Frequently, during the dwell period of the machine, the operator may wish to increase or decrease simultaneously the pulls exerted by the two side grippers and it has been a common practice in pulling-over machines to provide a hand lever for this purpose which is directly connected to the two side gripper-operating levers, usually by means of an interposed equalizing mechanism. In these prior arrangements, the hand lever provided for this purpose necessarily partakes of all of the movements of the gripper-operating levers during the initial stage in the cycle of power operations of the machine, prior to the dwell period, and as it swings to and fro this hand lever creates a real hazard to the safety of the operator. With a view of eliminating this hazard and also to render the operation of this hand lever more effective, in the herein illustrated machine, it is normally disconnected from the side gripper-operating levers and means are provided for selectively connecting it to the side gripper-operating levers, or, more specifically, to an intermediate oscillating member associated therewith, to render the hand lever operative for effecting movements of the side gripper-operating levers to increase or decrease the pull of the side grippers. Thus, not only does this hand lever remain stationary during the operation of the side grippers, but the operator is able to swing it to the most advantageous angular position for manipulating the side gripper-operating levers before he connects it to the intermediate member and renders it operative for the purpose in view.

In prior pulling-over machines, the last is supported in a heightwise direction against the force exerted on the upper by the grippers by means of a shoe rest and it is held in position on this shoe rest against lengthwise movement heelwardly, during the operation of overlaying and fastening-inserting devices in a later stage in the cycle of operations, by means of a heel rest. With these prior constructions, the operator places the shoe on the shoe rest and, after locating it in a lengthwise direction by placing the toe end of the last against the toe gripper, he swings it one way or the other, depending on whether it is a right or a left shoe, to place its forepart in the proper angular position relatively to the side grippers. During the initial stage in the cycle of operations of the machine, the heel rest is advanced into a position to engage the upper at the heel end of the last, which will be disposed to one side or the other of the longitudinal center line of the forepart of the shoe, and as it is thus advanced the heel rest is free to swing to the proper lateral position for engaging the heel end of the shoe. Thereafter, in response to pressure exerted on the shoe, the heel rest is locked against lateral movement and accordingly serves to hold the heel end of the last in the lateral position in which it was located by the operator when he placed the shoe in the machine.

In order to relieve the operator of the responsibility of correctly locating the shoe in the machine with its forepart in proper angular position, it has been previously proposed to shift the heel rest of a pulling-over machine to the desired lateral position before it is moved into engagement with the upper at the heel end of the shoe, thus causing the heel rest to serve as a means for positioning the heel end of the shoe in the machine. The herein illustrated machine, in accordance with a feature of the invention, provides a novel and improved mechanism for thus shifting the heel rest of a pulling-over machine, as well as improved means for operating the heel rest and shoe rest to force the last into the upper while it is being pulled over the last by the grippers. Thus, the herein illustrated machine has a heel rest, which is mounted on a support movable to displace the heel rest laterally to one or the other of two different positions for accommodating right and left shoes respectively, and is provided with a double track cam for positively displacing the heel rest from one of its two positions to the other at the conclusion of each cycle of operations of the machine, means also being provided for varying the effect of this cam to accommodate shoes on lasts of different styles. Although it is the usual practice in pulling-over machines to operate first on one shoe of a pair and then on the other, e. g., first a right shoe and then a left, etc., it may happen that the operator will desire to pull over two or more shoes for the same foot in succession. To permit such procedure, the aforementioned double track cam is provided with a gate portion which allows a cooperating cam roll operatively connected to the heel rest to be shifted from one track of the cam to the other, and manually operable means is provided for thus shifting the cam roll and hence the heel rest to its other position, prior to the initiation of a cycle of operations of the machine. Preferably, and as herein illustrated, the heel rest is advanced into engagement with the upper at the heel end of the shoe and then locked in position by fluid-pressure-operated means and thereafter the shoe rest is operated to force the last into the upper while it is being pulled over the last by the grippers. To facilitate this action of the shoe rest and also to avoid marring or marking of the upper at the heel end of the shoe as the result of relative movement between the heel end of the upper and the heel rest, in the herein illustrated machine, the heel rest and shoe rest are mounted for pivotal movement as a unit about an axis extending transversely of a shoe supported thereon, and means are provided for rocking the shoe rest and heel rest as a unit about this axis after the heel rest has been advanced and locked in engagement with the shoe.

As suggested above, pulling-over machines are usually arranged to come to a stop at an intermediate point in the cycle of operations to provide a "dwell" or "inspection" period during which the operator inspects the shoe to determine if the upper is properly located on and pulled over the last. After making such inspection and effecting such adjustments of the upper as circumstances require, the machine is again started and the cycle of operations is completed. It has been hitherto proposed, for example as in the machine disclosed in United States Letters Patent No. 1,128,723, issued on February 16, 1915, in the name of William T. B. Roberts, to provide the drive mechanism of a pulling-over machine with a system of gearing and clutches which makes it possible, after the initial stage of the cycle of operations has been completed, to operate the machine reversely and thereby return the grippers to their original positions. Such prior mechanisms are, however, somewhat complicated in construction, and add to the cost of the machine. Accordingly, and in accordance with another feature of the invention, the herein illustrated machine is provided with a novel and improved drive mechanism which is adapted to effect reverse operation of the machine, after the completion of the initial stage of the cycle of operations, without the use of an extra clutch or complicated gearing arrangements. More particularly, the machine of this invention is arranged to be driven by means of an electric motor which is connected to the main drive shaft of the machine by the usual clutch and control mechanism adapted to initiate a cycle of power operations and thereafter to bring the machine to a stop at the end of an initial stage of the cycle of operations, in response to the depression of a foot treadle. Thereafter, in response to a second depression of the same treadle, the machine is again started and eventually brought to a stop when the operating cycle of the machine has been completed. For driving the machine reversely, at the conclusion of the first stage of the cycle of operations, the herein illustrated machine is provided with a switch for reversing the direction of rotation of the driving motor and this switch is arranged to be closed in response to the depression of a second foot treadle which is also adapted to effect depression of the first treadle associated with the clutch-controlling mechanism. In order to prevent reverse operation of the machine except to the proper point in the cycle of operations, means under the control of a cam on the main drive shaft are provided for locking the second treadle against movement at any other time than at the conclusion of the initial stage in the cycle of operations of the machine.

In pulling-over machines of the so-called "inverted" type, the fastenings, for example tacks, are usually supplied to driver passages associated with the overlaying and fastening-inserting devices of the machine from a separating mechanism which is located on the upper portion of the machine frame through tack tubes which extend downwardly from the separating mechanism to locations somewhat below the driver passages and then curve upwardly to these passages. It has, therefore, been necessary to provide means for admitting to these tack tubes blasts of air under pressure to propel tacks along the upwardly curved portions of the tubes and into the driver passages. In these prior arrangements, the separator is usually operated to separate a load of tacks which are dropped into the tack tubes at or near the end of the final stage of a cycle of operations of the machine, these tacks being blown upwardly into the driver passages during the initial stage of the next cycle of operations of stage of each cycle of operations, when the machine is restarted after the "dwell" or "inspection" period, these overlaying and fastening-inserting devices are moved inwardly over the bottom of the shoe to wipe the lasting margin of the upper at the toe end and at the opposite sides of the last inwardly over the bottom of the shoe, whereupon the drivers are operated to drive the tacks for securing the upper in pulled-over position on the last. These overlaying and fastening devices are provided with spring-closed fingers for retaining the tacks within the driver passages which open to permit the driving of the tacks by the drivers. However, it frequently happens when the tacks are blown into the driver passages in the manner explained above that one or more of the tacks will become lodged between the tack fingers at the end of its driver passages with its point projecting therebetween. Now, when the overlaying device moves inwardly to wipe the upper over the bottom of the shoe, the upper may be cut or scratched by the projecting point of the tack which may also be bent over in such a manner that it cannot be properly driven into the shoe. Furthermore, the bent over tack may fall back into the driver passage and become jammed therein when the driver is subsequently operated. To overcome these difficulties, in the herein illustrated machine the tacks which are separated and dropped into the tack tubes at the end of the final stage in a cycle of operations are blown upwardly into the driver passages by blasts of air under pressure which are admitted into the tack tubes immediately after the machine is restarted following the dwell or inspection period of the next succeeding cycle of operations of the machine. Due to the speed at which the main drive shaft operates and the fact that an appreciable period of time is required for the air blast to overcome the inertia of the tacks and to elevate them into the driver passages, the tacks actually enter the driving passages only after the overlaying devices have at least partially completed their wiping actions and just before the tack drivers are operated to drive the tacks.

The above and other objects and features of the invention, including novel mechanism for automatically operating a tip gage, improved means for effecting movements of the side grippers in directions extending lengthwise of the last, and novel mechanism for adjusting the toe and side grippers respectively, lengthwise and widthwise of the shoe, to accommodate shoes of different sizes, will appear in the following detailed description of the preferred embodiment of the invention shown in the accompanying drawings and will be pointed out in the claims.

In the drawings,

Fig. 3 is a view in side elevation of a portion of the machine at an enlarged scale, showing mechanism for operating the grippers of the machine;

Fig. 4 is a view in front elevation and at still further enlarged scale of a portion of the gripper-operating mechanism illustrated in Fig. 3;

Figs. 5 and 6 are views at an enlarged scale and in section taken, respectively, on lines V—V and VI—VI of Fig. 3 and looking in the direction of the arrows;

Fig. 7 is a view in section substantially on line VII—VII of Fig. 5 and looking in the direction of the arrows;

Fig. 8 is a view in side elevation showing certain operating mechanisms of the machine;

Fig. 9 is a view in front elevation of a portion of one of the mechanisms illustrated in Fig. 8;

Fig. 12 is a view generally in plan and at an enlarged scale of a portion of the machine as viewed looking in the direction of the arrow "A" in Fig. 2;

Fig. 13 is a view in section substantially on line XIII—XIII of Fig. 12 and looking in the direction of the arrows;

Fig. 23 is a view in end elevation of a portion of the driving and controlling mechanism of the machine;

Fig. 24 is a plan view of a portion of the mechanism shown in Fig. 23;

Fig. 25 is a view in section substantially on line XXV—XXV of Fig. 23 looking in the direction of the arrows;

Fig. 26 is a view in front elevation of another portion of the machine showing other parts of the drive and controlling mechanism;

Fig. 27 is a view in section substantially on lines XXVII—XXVII of Fig. 26 and looking in the direction of the arrows;

Fig. 28 is a view in front elevation showing a portion of the tack-separating mechanism associated with the machine; and Fig. 29 is a view in side elevation and at an enlarged scale of a portion of the machine and showing a tip gage together with its operating mechanism.

Figure 1:
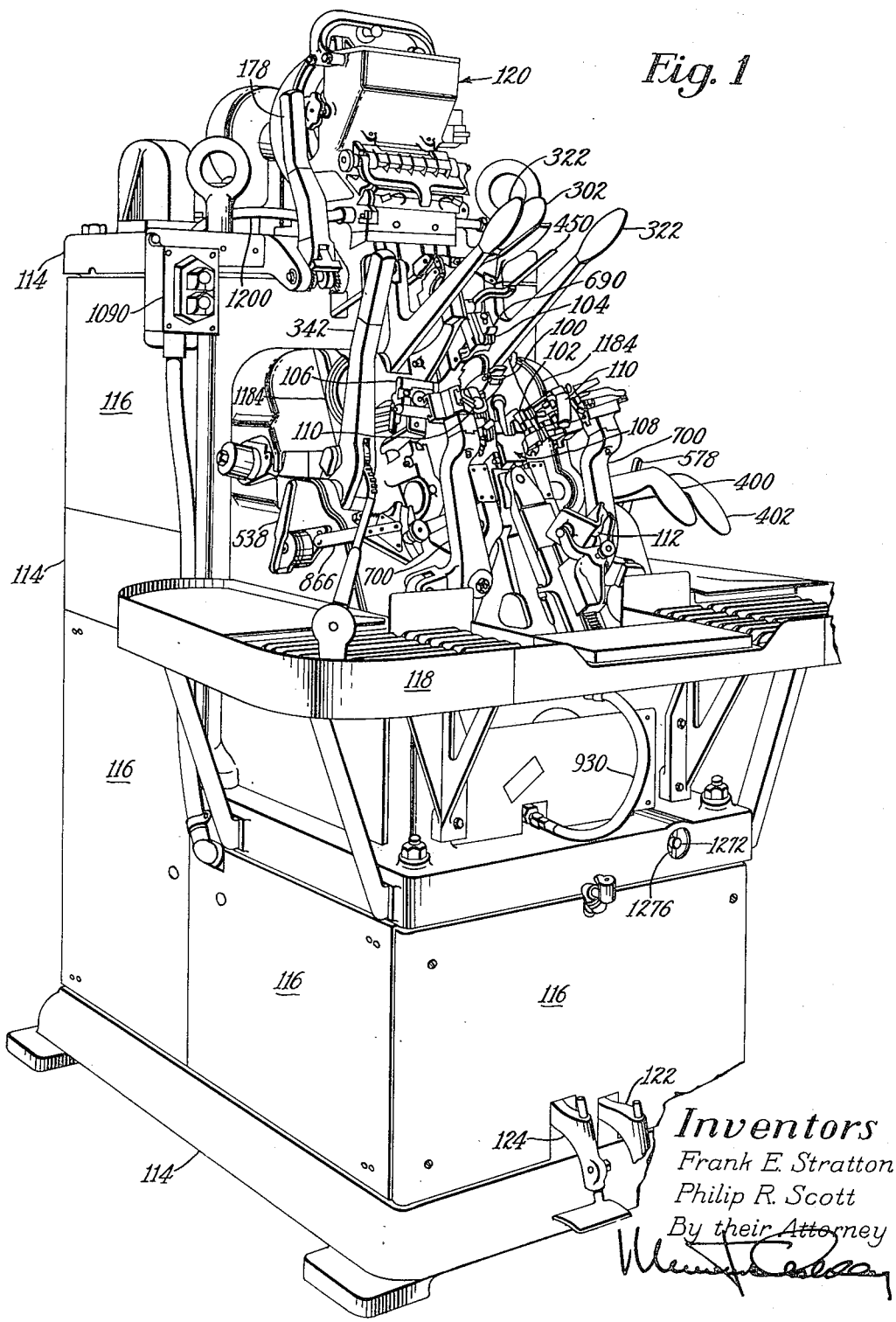
Fig. 1 is a view in perspective of a machine embodying the features of the invention.

Referring to these drawings and particularly Figs. 1 and 2 thereof, the machine therein illustrated has a toe gripper 100 and a pair of side grippers 102, 102 for pulling the upper of a shoe over a last and associated with each of these grippers is an overlaying and fastener-inserting device, hereinafter referred to as a tacker, for wiping the lasting margin of the upper inwardly over and for securing it to the bottom of the shoe, the toe tacker being identified by the reference character 104 and the side tackers by the reference characters 106, 106. For supporting a shoe in the machine with the toe end of its last uppermost and inclined rearwardly away from an operator, the machine is provided with a shoe rest 108. During that portion of the operating cycle of the machine when the overlaying and fastener-inserting devices are being operated, the shoe is held against displacement by means of a pair of side clamps 110, 110 and a heel rest 112, the latter also serving to locate the last relatively to the side grippers as will be explained in detail below. The mentioned elements of the machine are associated with and the grippers and overlaying and fastener-inserting devices are operated by mechanism that is contained within a frame indicated generally by the reference character 114. This frame is of a fabricated construction and is provided with several closure panels 116, 116 which are removable to permit access to mechanism inside of the frame and has a conveniently located work shelf 118. Mounted on the upper portion of the machine frame is a tack separating and supplying mechanism, indicated generally by the reference character 120, from which tacks are supplied to the over-laying and fastener-inserting devices, or tackers, in a manner which will be explained below. As will presently appear, the operation of the machine is controlled by mechanism including two foot treadles 122, 124 which are located at the lower part of the front of the machine.

Referring to Fig. 3, the toe gripper 100 is connected to a toe-gripper operating lever 130 and the two side grippers 102, 102 are each connected to a side gripper-operating lever 132, these gripper-operating levers being fulcrumed at their lower ends on a housing member 134 which is associated with a portion of the machine frame 114. Also connected to the toe gripper-operating lever 130 is one end of a link 136 the other end of which is connected to one arm of a bell-crank lever 138, Fig. 4, which is pivotally mounted on a shaft 140 supported on a bracket member 142 associated with portions of the frame construction 114. Connected to the other arm of this bell-crank lever is a shouldered hollow rod 144 in which there is slidably fitted a second smaller rod 146 having a threaded upper end which is connected to a lever arm 148, Fig. 3. This lever arm is fast on a shaft 150 which is journaled in a bracket member 152 secured to an upper portion of the machine frame. Interposed between the shoulder on the rod 144 and an adjusting nut 154, threaded on the rod 146, is a relatively long compression spring 156. Each of the side gripper-operating levers 132 is connected to one arm of a bell-crank lever 160 by means of a link 162 and these bell-crank levers are pivotally mounted on the aforementioned shaft 140. Connected to the other arms of each of the bell-crank levers 160 is a shouldered hollow rod 164 in which there is slidably received a smaller rod 166, having a threaded upper end, Fig. 4, which is connected to a lever arm 168, Fig. 3, these two lever arms being formed integrally with the arm 148 and thus being fast on the shaft 150. Interposed between the shoulder on each of the rods 164 and an adjusting nut 170 on each of the rods 166 is a relatively long compression spring 172. Secured to one end of the shaft 150 is a lever arm 174 which is connected by means of a link 176 to a hand lever 178, pivotally mounted on the upper portion of the machine frame.

Associated with this hand lever is a locking pawl 180 which is normally urged into engagement with ratchet teeth 182, fixed with respect to the frame 114, by means of a spring, not shown, for holding the hand lever in different angular positions. A plunger 186 extending through the end of this hand lever is provided for withdrawing the pawl to release the lever for movement by the operator. As will be apparent, the lever arms 148, 168, 168 provide a common support for the gripper-operating springs 156, 172, 172, the position of which may be altered to vary simultaneously the tension of the gripper-operating springs and hence the intensities of the pulling forces applied by the grippers, by movement of the hand lever 178 to different angular positions in which it is held by the locking pawl 180. The effective length of the lever arm 148 is approximately one-half of the effective length of the lever arms 168 so that the variation in the pulling force of the toe gripper 100 is correspondingly less than the variation of the pulling force of the side grippers in response to a predetermined angular displacement of the hand lever 178.

The toe gripper-operating lever is provided with a relatively shorter arm 190 which carries at its outer end a roller 192 adapted to contact a pressure pad 194 associated with a slide 196, Fig. 6. This slide is mounted for vertical movement on one side of a double guide bracket 198, Fig. 7, supported on a portion of the machine frame 114, and carries a cam roll 200 which runs in the cam track 201 of a cam 202, Fig. 6. Each side gripper has a relatively shorter arm 204 which carries at its outer end a roller 206 and these rollers are each adapted to contact a pressure pad 208 associated with a second slide 210, Fig. 5. The slide 210 is mounted for vertical movement on the other side of the double guide bracket 198 and carries a cam roll 212 which runs in the cam track 214 of a cam 216, Fig. 5. As shown in Fig. 7, the slides 196, 210 are bifurcated to embrace hub portions formed on the cams 202, 216 which are secured to a main drive shaft 218, journaled in the housing 134, Fig. 3. As will be apparent, the cam tracks 201, 214 are so shaped that as the main drive shaft is rotated through a complete turn in a clockwise direction, as viewed from the left in Fig. 3 and indicated by the arrows in Figs. 5 and 6, the slides 196, 210 will first be moved downwardly and then returned to their original positions. It will be understood, during the downward movement of these slides, that the gripper-operating levers 130, 132, 132 will be swung in a counter-clockwise direction by the three gripper-operating springs 156, 172, 172 and as a result the toe gripper 100 and side grippers 102 will be operated first to close on the upper of a shoe and then to exert a tensioning pull thereon, the pressure pads 194, 208, 208 eventually moving away from the rollers 192, 206, 206 so that the springs 156, 172, 172 act directly on the grippers, at which point in the operating cycle the main drive shaft is brought to a stop as is usual in pulling-over machines.

The toe and side grippers illustrated are of conventional construction and during the initial portions of the movements of their operating levers, the jaws of these grippers are closed on the upper materials after which the continued movements of the gripper-operating levers are effective to move the grippers bodily in a direction to cause the grippers to exert their tensioning pulls. As the springs 156, 172, 172 thus operate to move the gripper-operating levers, they expand and hence the force exerted by each of these springs decreases. However, due to the angular disposition of the arms of the bell-crank levers 138, 160, 160 to the lines of actions of their associated springs and to the directions of movement of the grippers connected thereto, i. e., through the links 136, 162, 162, the mechanical advantages of these bell-crank levers increase as the tension of these springs decreases. Thus, the pull applied by each of these grippers is substantially constant throughout the entire range of movement of the gripper.

During the dwell period provided when the main drive shaft 218 comes to a stop with the grippers exerting their respective pulls on the upper at the toe end and opposite sides of the last, the operator may wish to vary the intensity of the pull exerted by one or more of these grippers, or to change the position of the upper on the last, by suitable manipulation of the toe and/or side grippers. For thus manipulating the toe gripper of the herein illustrated machine, there is pivotally mounted on the machine frame, directly above the toe gripper 100 and within easy reach of an operator standing in front of the machine, see Fig. 1, a bell-crank lever 300 having one relatively long arm providing an operating handle 302 and a shorter arm 304, Fig. 3. Connected at one end to the arm 304 is a link 306 the other end of which is connected to the toe gripper-operating lever 130 at the end of this lever opposite to that on which the lever is fulcrumed. Thus, by imparting angular movements to the handle 302 in one direction or the other, the operator can increase or decrease the intensity of the pull applied to the toe gripper 100. However, due to the mechanical advantage of the bell-crank lever 300 such manipulation of the toe gripper is very greatly facilitated over prior arrangements in which the operator takes hold of the end of the gripper-operating lever and operates it directly. As is common in pulling-over machines, there is pivoted on the handle 302 an auxiliary hand grip 308 which is connected to mechanism for opening the jaws of the toe gripper which may be similar to that disclosed in the above-mentioned McFeely patent, this hand grip being connected to the jaw-opening mechanism by means of links 310, 312 and levers 314, 316, Fig. 3. In a like manner, each of the side gripper-operating levers 132, 132 is connected to the shorter arm 318 of the bell-crank lever 320, provided with an operating handle 322, by means of a link 324 which extends between the shorter arm of the bell-crank lever and that end of the respective side gripper-operating lever which is opposite to that on which the operating lever is fulcrumed. Hence, by means of the operating handles 322, 322, which are conveniently located directly above their associated side grippers, see Fig. 1, the operator can increase or decrease the intensity of the pull of one or both of the side grippers, in the manner desired, by suitable displacement of the operating levers 132, 132 which he is easily able to effect because of the mechanical advantage provided by the bell-crank levers 320, 320.

In addition to the manipulation of the gripper-operating levers 132, 132 for the purpose of increasing or decreasing the intensities of the pulls exerted on the upper by the side grippers, the operator may wish to move the two side grippers simultaneously in a direction to relieve the pull applied by these grippers in order to facilitate movements of these grippers in directions extending lengthwise of the shoe for the purpose of positioning the upper relatively to the last. For this purpose, there is pivotally mounted on a portion of the machine frame, by means of a shaft 340, a hand lever 342, Figs. 1 and 8. Also journaled on this shaft is a quadrant member 344 which is provided with a series of teeth 346 adapted to be engaged by a locking pawl 348. This pawl is pivotally mounted on the hand lever 342 and is connected by means of a link 350 to a hand grip 352. A coil spring 354 is arranged to act on the hand grip in a direction to withdraw the pawl to the position in which it is shown in Fig. 8 and a coil spring 356 is provided for normally holding the hand lever 342 in its idle position. Connected at one end to the quadrant member 344 is a link 358 which is connected at its opposite end to a triangular shaped arm 360, pivotally supported on a portion of the machine frame 114. Also connected to the arm 360 is one end of a second link 362 the opposite end of which is connected to an arm 364, Fig. 3. This arm is fast on one end of a rockshaft 366 which is journaled in a portion of the bracket member 142, Fig. 4. Pinned to the shaft 366 is a second arm 368 in which there is mounted by means of a ball and socket joint 370, an equalizing lever 372. At its opposite ends this equalizing lever is connected, by means of links 374, 374, to arms 376, 376 which are formed integrally with each of the bell-crank levers 160, 160.

With the arrangement just described, when the operator wishes to move the two side grippers 102, 102 simultaneously equal distances from the positions which they have assumed in pulling the upper over the last, he takes hold of the hand lever 342 and, after moving it into the most advantageous angular position, he operates the hand grip to connect the hand lever to the quadrant member 344 and then he effects the desired action of the side grippers by suitable manual movement of the hand lever. Thereafter, when the upper has been properly positioned on the last by appropriate movements of the side grippers in directions lengthwise of the last, the operator releases the hand grip and thereby disconnects the quadrant member from the hand lever. The side-gripper operating springs now return the side grippers to their pulling positions and during the subsequent completion of the operating cycle of the machine, the hand lever 342 remains in its idle position.

As is the usual practice in pulling-over machines, the action of the side grippers is controlled by means of a suitable hydraulic dashpot, which in the herein illustrated machine is of conventional construction and indicated by the reference character 380 in Fig. 8. This dashpot has an operating arm 381 which is connetced to the triangular shaped arm 360, previously referred to, by means of a link 382, and a control valve having a stem 383, adapted to be operated in a manner pointed out below by means of a lever 384 and an adjustable link 386. In addition to the action of the dashpot, the operator may impose a further control over the pulling actions of the side grippers by means of the hand lever 342 which he may move in a selected direction, after connecting it to the quadrant 344, either to retard the pull of the side grippers or to increase this pull.

For moving the side grippers in directions extending lengthwise of the shoe to position the upper relatively to its last, the herein illustrated machine is provided with two hand levers 400, 402, Fig. 1, which are connected, respectively, to a solid shaft 404 and a hollow shaft 406, each of these shafts being journaled in a portion of the machine frame 114, see Fig. 12. The shaft 404 is operatively connected to a guide member 408, associated with the side gripper on the left-hand side of the machine, by means of pinion teeth 410 cut on this shaft and rack teeth 412 formed on a portion of the guide member, while the shaft 406 is similarly connected to a guide member 414, associated with the side gripper on the right-hand side of the machine. Compression springs, one of which is indicated by the reference character 416, are provided for returning each of the side grippers to their normal positions at a predetermined time in the operating cycle of the machine. For holding the side grippers in positions to which they are moved by means of the hand levers 400, 402, there is associated with each of the shafts 404, 406 a locking device, the particular locking device which is associated with the shaft 404 being shown in detail in Fig. 12.

Figure 10:
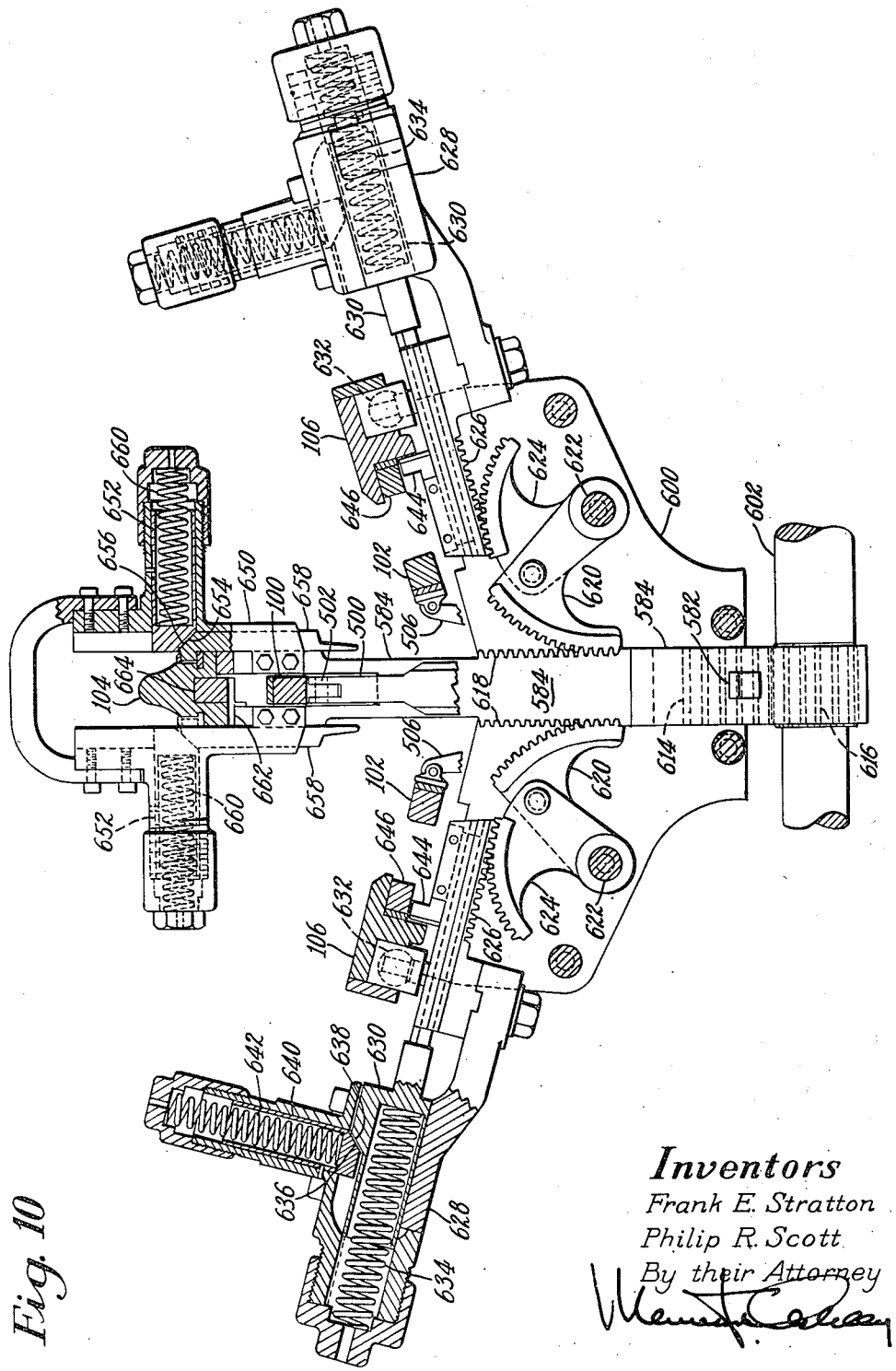
Fig. 10 is a view, generally in plan, of another portion of the operating mechanisms shown in Fig. 8 with certain parts in section and others omitted.

Connected to the shaft 404 is a cylindrical member 420 which is provided on its peripheral surface with a circumferential series of V-shaped teeth 422. Slidably mounted in one end of a sleeve 424, pressed into one end of a bore 430 formed in the portion of the frame 114, is a locking plug 426 provided with teeth 428 for engaging the teeth 422 of the member 420. The plug 426 is held against rotation in the sleeve 424 by means of a cross pin 436 which passes through the plug and fits in opposed slots 438, 438 in this sleeve. Slidably mounted in the bore 430 and held against rotation by means of a screw 432, the reduced end of which enters an elongated slot 434 therein, is a second sleeve 435. At its outer end the sleeve 435 is provided with a head portion 440 formed on one side with a camming surface 442. Each of the side tackers 110 has formed thereon a boss 444, and when these tackers are in their outermost positions, as shown in Figs. 10 and 12, these bosses engage the head portions 440 of the sleeves 435 so that compression springs 446 contained within these sleeves are compressed to urge the locking plugs 426 into locking engagement with the teeth 422 on the members 420. Hence, when either one or both of the hand levers 400, 402 are operated to shift the side grippers 102 in a direction lengthwise of the last, the grippers will be held in the positions to which they have been moved by the operator. However, as the side tackers 106 are moved inwardly, during a subsequent stage in the cycle of operations of the machine, these bosses pass beyond the head portions 440 thereby relaxing the springs 446 and releasing the shafts 400, 406 so that the side grippers 102 may be returned to their normal positions, lengthwise of the shoe by the compression springs 416. Later in the cycle of operations, the side tackers are moved outwardly to their original positions, and, as this occurs, the bosses 444 act on the camming surfaces 442 to compress the springs 446 and render the locking plugs 426 again active for locking the shafts 404, 406.

For facilitating the positioning of the upper on its last in response to lengthwise movements of the side grippers, during the dwell period in the cycle of operations of the machine, the herein illustrated machine is provided with a tip gage 450 of conventional construction, Figs. 1 and 29. This tip gage is adjustably secured to an arm 452, by means of a screw 454, and this arm is carried by a shaft 456. The shaft 456 is journaled in the outer end portion of a bracket member 458 which projects forwardly and upwardly from a portion of the machine frame, in a location adjacent to one of the side gripper manipulating levers 322. Fast on this shaft is a pinion 460 which is in mesh with a rack bar 462, slidably mounted in the bracket member 458. At its upper end the rack bar 462 carries a roll 464 which is in vertical alinement with a finger 466, adjustably secured to one side of the lever 322. With this arrangement, when the machine is idle and before the side grippers are operated, the tip gage 450 is held in an elevated idle position, shown in solid lines in Fig. 29, as a result of the engagement of the finger 466 with the roll 464. However, upon operation of the side grippers during the first stage in the cycle of operations of the machine, the hand levers 322 are moved upwardly and the finger 466 is withdrawn from the roll 464 thereby releasing the tip gage to the action of gravity which swings it downwardly to its operative position as shown in dotted lines in Fig. 29. A latch 468, pivoted on the bracket member 458, may be moved into a position to engage a pin 470, projecting from the arm 454, when it is desired to dispense with the use of the tip gage.

Figure 11:
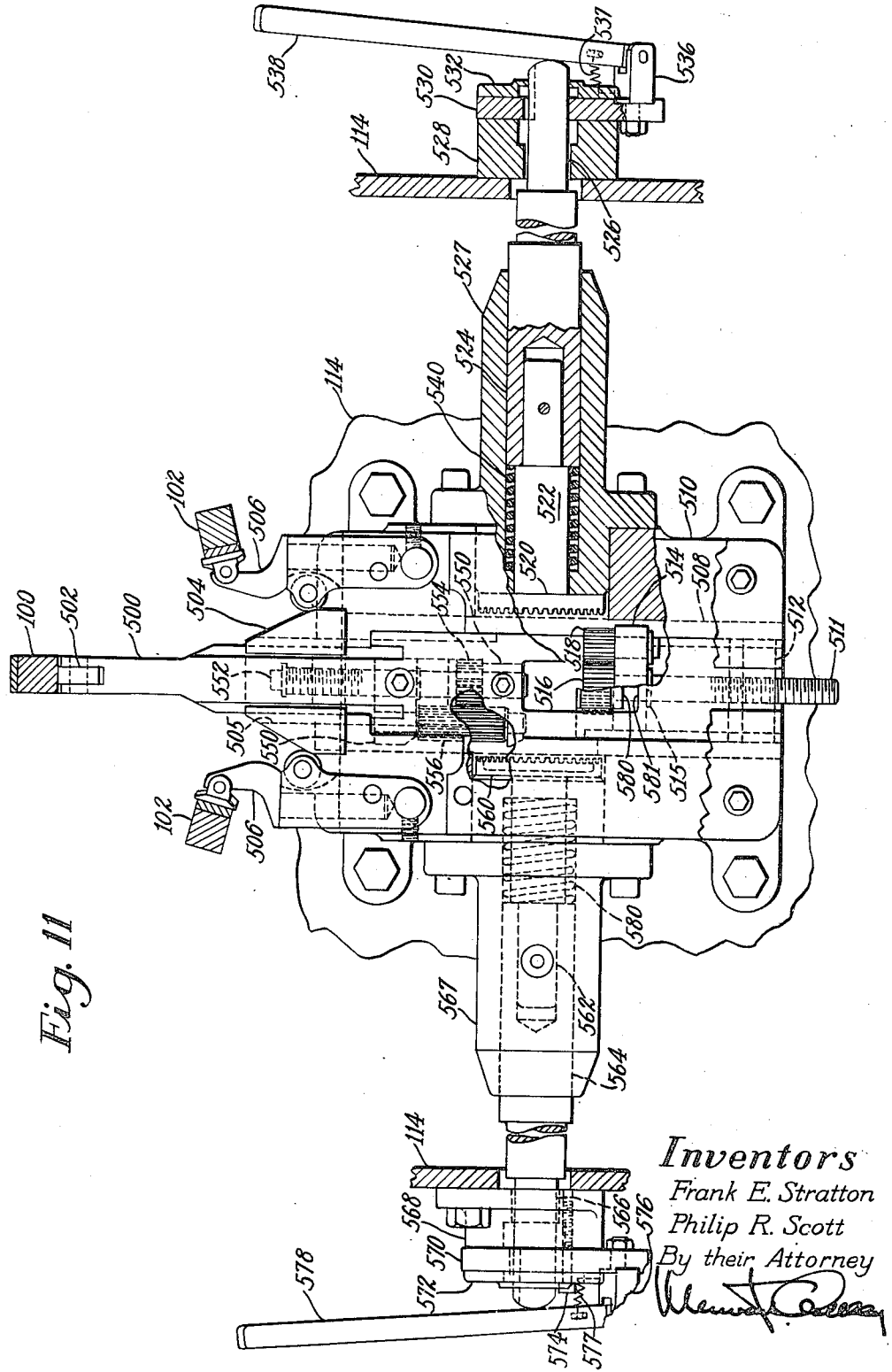
Fig. 11 is a view, generally in plan but looking from below, of still another portion of the mechanisms shown in Fig. 8 with certain parts in section.

The toe gripper 100 and the side grippers 102, 102 of the herein illustrated machine are initially positioned, respectively, lengthwise and widthwise of the last over which the upper is being pulled by means of a so-called gripper-spreading mechanism which, in some respects, is similar to that disclosed in United States Letters Patent No. 1,844,856, issued on February 9, 1932 in the name of Bernhardt Jorgensen. This mechanism includes a bar 500 which carries on its end a roller 502 adapted to engage the toe gripper 100, see Figs. 8, 10 and 11, and a wedge block 504 adapted to operate a pair of side gripper-positioning arms 506, 506, Figs. 10 and 11. The bar 500 is mounted for adjustment relatively to the wedge block, in a manner to be presently explained, while the wedge block is mounted for adjustment relatively to a slide 508 which is supported for longitudinal movement in a housing 510, associated with a portion of the machine frame 114, Figs. 8 and 11. For adjusting the wedge block 504 relatively to the slide 508, an adjusting screw 511 is threaded into a portion 512 of this slide and has one end journaled in an upstanding portion 514 of the wedge block, Fig. 11. This screw is held against axial movement relatively to the wedge block by means of a spring washer 515 on the screw and a gear 516 secured to the end of the screw. Also journaled on the upstanding portion 514 is an idler gear 518. When the machine is idle, the gear 518 is in alinement with the teeth of a face gear 520 which is formed on one end of a stub shaft 522. The shaft 522 is pinned to an adjusting shaft 524 which is journaled in a bearing member 527, secured to the housing 510, and has an end portion 526 of reduced diameter. This reduced end portion of the shaft 524 extends into a housing 528, secured on a portion of the frame 114, against the outer end of which a disk member 530, splined to the reduced end portion 526 of the shaft 524, is rotatably supported by means of a cover member 532, held in place by screws 534 threaded into the housing and passing through clearance slots 535 in the disk. Pivotally mounted on a block 536 secured to this disk is an operating handle 538. A coil spring 540 normally holds the face gear 520 against one end of the bearing member 527 and out of mesh with the gear 518. As will be apparent, when the handle 538, which is urged into engagement with the end of the shaft 524 by means of a relatively light coil spring 537, is swung to the left, Fig. 11, the gear 520 will be meshed with the gear 518 so that the adjusting screw 511 can be rotated by means of the handle 538 and interposed gearing to vary the position of the wedge block 504, together with the bar 500 which is carried thereby, relatively to the slide 508, thereby simultaneously varying the so-called spread of the toe and side grippers.

For adjusting the bar 500 relatively to the wedge block 504, in order to change the lengthwise position of the toe gripper without changing the spread of the side grippers, an arrangement similar to that just described is provided. Thus, the bar 500 is slidable in a guideway 505 formed on the wedge block 504, and rotatably mounted in upstanding portions 550, 550 formed on the bar 500, Fig. 8, is an adjusting screw 552 which is threaded into a portion of the wedge block. Fast on this screw is a pinion 554 which is in mesh with an elongated gear 556 rotatably mounted on a shaft carried by the upstanding portion 550 of the bar 500. Hence, by rotation of the screw 552 by means of the gear 556 and pinion 554, the bar 500 may be adjusted relatively to the wedge block. For thus rotating the screw, a face gear 560 is provided and this gear is carried by a stub shaft 562 which is pinned to an adjusting shaft 564. This shaft is journaled in a bearing member 567 and has a reduced end portion 566 which extends into a housing 568 against the outer end of which a disk member 570, splined to the reduced end portion 566 of the shaft 564, is rotatably supported by means of a cover 572 held in place by screws 574 which are threaded into the housing and pass through clearance slots in the disk. Pivotally mounted on a block 576 secured to this disk is an operating handle 578 which is held against the end of the shaft 564 by means of a relatively light spring 577. A coil spring 580 normally holds the face gear 560 out of mesh with the elongated gear 556. However, when the handle 578 is swung to the right, Fig. 11, these gears will be brought into mesh so that the adjusting screw 552 can be rotated by the handle 578 to vary the position of the bar 500 relatively to the wedge block 504.

The slide 508 is provided with an abutment 580 which projects through an opening 581 in the housing 510 and is continuously urged, by means of springs, not shown, in a downward direction, Fig. 8, to hold this abutment in engagement with a similar abutment which projects from a rack bar 584. As will presently appear, during the second stage of the cycle of operations of the machine, after the so-called dwell period, this rack bar is moved downwardly for the purpose of moving the overlaying and fastener-inserting devices inwardly over the bottom of the shoe. The toe gripper is held against the roller 502 and the two side grippers are held against the arms 506, 506 by means of springs, not shown. Accordingly, when the rack bar 584 and slide 508 move downwardly, the grippers will be moved inwardly out of the way of the incoming overlaying and fastener-inserting devices, the gripper jaws having been previously opened to release the stock at a predetermined point in the inward movements of the overlaying and fastening devices. During this collapsing movement of the grippers, the face gears 520, 560 are out of mesh with the gears 518, 556 so that these gears do not rotate during this time. At its lower end, the link 386 carries a cam roll 385 which rides on a cam 387 secured to one end of a shaft 602. This cam is so shaped that during the collapsing movements of the grippers the control valve of the hydraulic dashpot 380 is opened so that the side grippers may be moved quickly away from the bottom of the shoe by their operating springs.

The mechanism for moving the overlaying and fastener-inserting devices inwardly and outwardly during the cycle of power operations of the machine is substantially similar to that provided in prior machines, for example, of the type disclosed in the McFeely patent referred to above, see also United States Letters Patent No. 1,648,403, issued on November 8, 1927 in the name of Bernhardt Jorgensen. Referring to Figs. 8 to 10, this mechanism includes a fabricated supporting structure 600 which is rotatably mounted on a cross shaft 602, journaled in bearings 604, 604, Fig. 9, associated with the housing 134, referred to above. Formed integrally with this supporting structure is an arm 606 carrying a cam roll 608 which runs in the cam track 610 of a cam 612, Fig. 8, keyed to the main drive shaft 218. The rack bar 584, which is slidably mounted in the supporting structure 600, is provided on one side with rack teeth 614 which are in mesh with the teeth of a gear 616 formed integrally with the shaft 602, and along its opposite edges with two other sets of rack teeth 618, 618, Fig. 10. The rack teeth 618, 618 are in mesh, respectively, with the teeth of gear quadrants 620, 620 which are pivotally mounted on the supporting structure by means of studs 622, 622. Also pivoted on these same studs and connected to the quadrants 620, 620 are two other gear quadrants 624, 624 of somewhat shorter radius, the teeth of which are each in mesh with a rack bar 626. These rack bars, which are slidable in the supporting structure 600, are each connected to a housing member 628 in which there is mounted a hollow plunger 630. Each of these plungers has an extension which is slidable within its associated rack bar 626 and is connected to a side overlaying and fastener-inserting device, i. e., side tacker 106, by means of a ball joint 632. A coil spring 634, fitted within each of the plungers 630, tends to urge the tacker arms to the innermost limits of their movement as determined by latch plates 644, 644 carried by the tackers. Formed on each of the plungers 630 is a wedge surface 636 which is complemental to a wedge surface 638 formed on another hollow plunger 640, also associated with each of the housing members 628 and in which there is located a compression spring 642. The latch plates 644 are adapted to engage projections on driver bars 646, 646 associated with the side tackers for the purpose of moving these bars in directions to compress side tack driver springs in response to the rocking movement of the supporting structure 600.

At its upper end, the rack bar 584 is connected to a housing 650 in which there are mounted two hollow plungers 652, 652 each provided with a wedging surface 654 which is complemental to wedging surfaces 656 formed on slides 658. These slides are mounted for movement in the housing 650 and are connected to the overlaying and fastener-inserting device which operates at the toe end of the shoe, i. e., the toe tacker. Received within each of these hollow plungers is a compression spring 660. Fastened to the upper end of the rack bar 584 is a latch plate 662 which is adapted to engage a projection on a driver bar 664, associated with the toe tacker 104, for the purpose of moving this bar in the direction to compress the toe tacker driver spring in response to rocking movement of the supporting structure 600. Formed integrally with one end of the shaft 602 is a pinion 670, Fig. 9, and this pinion is in mesh with a gear quadrant 672 carried on one arm of a lever 674. This lever is pivotally mounted on a cross shaft 676, Fig. 9, and its other arm carries a cam roll 678 which runs in the track 680 of a cam 682, Fig. 8, keyed to the main drive shaft 218.

At the beginning of each cycle of power operations of the machine, the various parts of the mechanism for operating the toe and side tackers are in the positions shown in Figs. 8, 9 and 10 of the drawings and these parts remain in these positions during the initial stage in the cycle of operations. Shortly after the machine has again been started, following the dwell period, the rack bar 584 is moved downwardly, Figs. 8 and 9, by the action of the cam 682 and, as a result of this movement of the rack bar, the toe tacker 104 and the side tackers 106, 106 are moved inwardly over the bottom of the shoe. Such inward movements of the toe and side tackers are eventually terminated, in the case of the toe tacker, by engagement of a stop plate 690, Figs. 1 and 2, with the toe end of the shoe, and in the case of the side tackers, by the engagement of stop abutments thereon with cooperating abutments carried by the side clamps 110, 110 which have previously been moved into clamping engagement with the shoe. During the continued movement of the rack bar 584, the plungers 640, 640, 652, 652 are wedged outwardly as the housings 628, 628, 650 continue their inward movements, thereby withdrawing the latch plates 644, 644, 662 and releasing the driver bars 646, 646, 664 to the action of their respective springs. Later, in the second stage of the cycle of operations, the supporting structure 600 is rocked about the axis of the shaft 602 first in a clockwise direction and then in a counterclockwise direction, Fig. 8, by the action of the cam 612. Just before the supporting structure is rocked in a counterclockwise direction, the rack bar 584 is moved upwardly to return the toe tacker and side tackers to their original positions, as shown in Fig. 10, and the plates 644, 644, 662 are reengaged by the projections on the driver bars 646, 646, 664. Hence, when the supporting structure is rocked in a counterclockwise direction, the driver bar operating springs are recocked for the next operation of the tackers. The toe tacker spring, not shown, is associated with a driver bar operating arm 691, Fig. 2, while the side tacker springs, one of which is indicated by reference character 692 in Fig. 23, are associated, respectively, with a driver bar operating arm 694.

The two side clamps 110, 110 are carried by two bell-crank levers 700, 700 which are pivotally mounted on the frame of the machine, as shown in Fig. 12. Connected to each of these bell-crank levers is an operating link 702, one of these links appearing in Fig. 12. Associated with each of these links, which extend through apertures 704 formed in the frame of the machine, one of which apertures appears in Fig. 12, is the upper end of a compression spring 706. At their lower ends these compression springs are connected to the opposite ends of an equalizing lever 708 which carries a cam roll 710, Fig. 14. This cam roll rides on the periphery of a cam 712 which is secured to the main drive shaft 218 of the machine. This cam is so shaped that, at an appropriate time in the second statge of the cycle of operations of the machine and just before the toe gripper and side grippers are opened by the inwardly moving toe and side tackers, the side clamps are moved yieldingly into engagement with the upper at the opposite sides of the forepart of the last. Thereafter, at a later point in the cycle of operations, these clamps are withdrawn to release the shoe. For centralizing the equalizing lever 708 and roll 710, relatively to the cam 712, suitable guide members 714, which engage the opposite ends of the equalizing lever, are provided, one of these guides appearing in Fig. 2.

Figure 14:
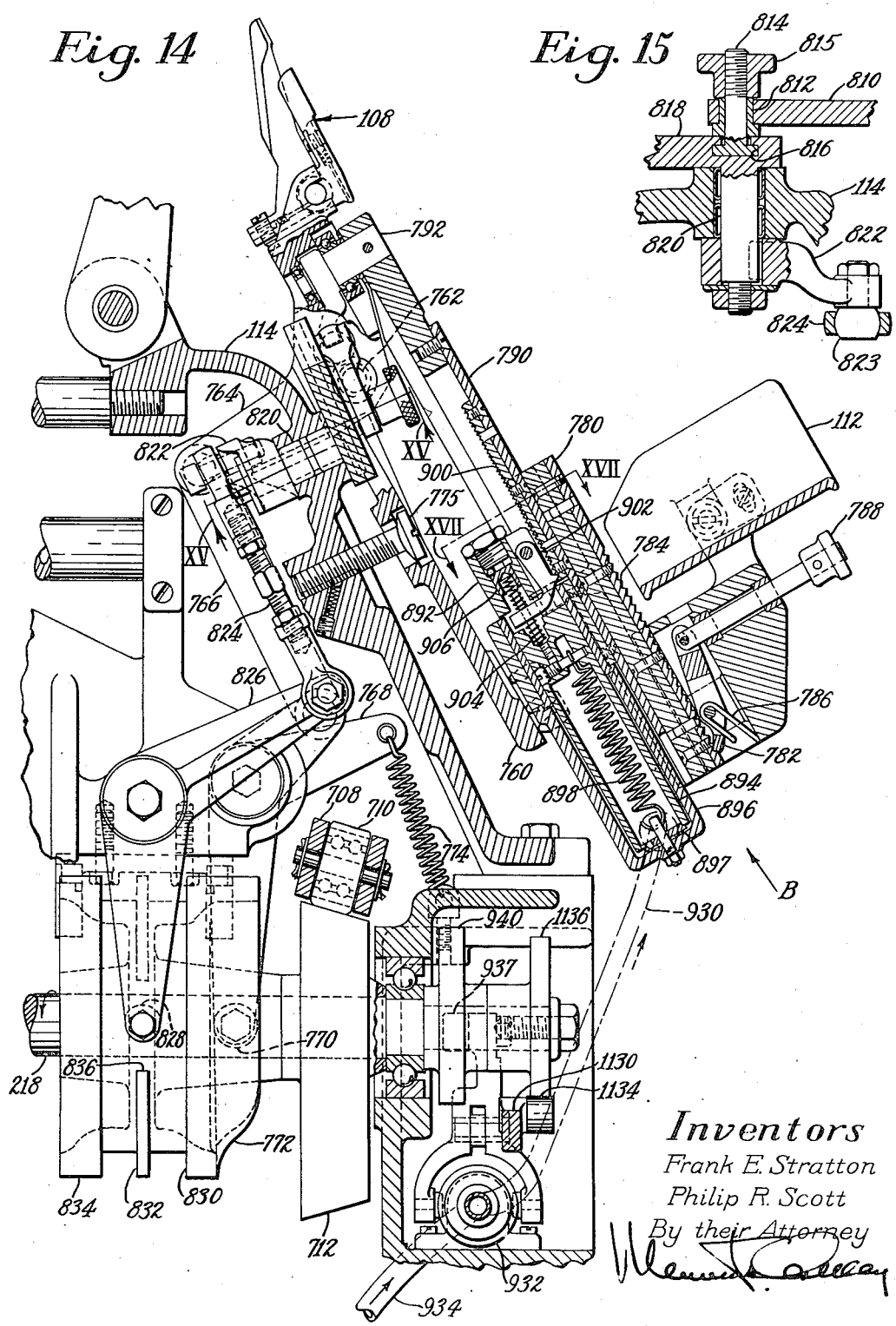
Fig. 14 is a view in side elevation of that portion of the machine which is shown in Fig. 12 with certain parts in vertical section and others broken away.
Figure 15:
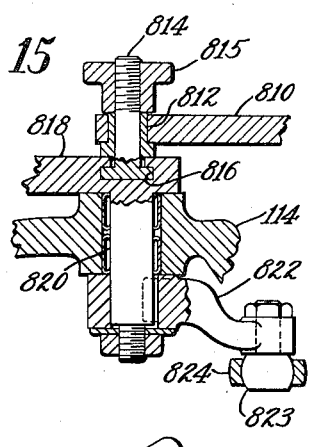
Fig. 15 is a view in section substantially on line XV—XV of Fig. 14 and looking in the direction of the arrows.

The shoe rest 108 is secured to the upper end of a platform 760 which is pivotally mounted on a cross shaft 762, journaled in a portion of the machine frame 114, Figs. 12 and 14, for rocking movement about an axis extending transversely of the last over which an upper is being pulled. Formed integrally with this platform are a pair of arms 764 which are connected by means of a link 766 to one arm of a three-armed lever 768, Fig. 14. Another arm of this lever carries a cam roll 770 which is held against a face cam 772 by means of a coil spring 774, connected to the third arm of this lever, Fig. 14. A headed stop screw 775 is provided, Fig. 14, for limiting swinging movement of the platform 760 by spring 774. The heel rest 112 is of conventional V-shape construction and is slidably mounted for adjusting movement on a slide member 780. Associated with the heel rest is a pawl 782 which is urged into engagement with ratchet teeth 784, formed on the slide member 780, by means of a spring 786, a plunger 788 being connected to this pawl for operating it to release the heel rest for movement in one direction, movement in the other direction being permitted by the inclined shape of the ratchet teeth 784. The slide member 780 is slidably supported on a supporting member 790. Pinned to the upper end of the supporting member 790 is a pivot shaft 792 which is journaled in bearings carried by the platform 760. Thus, the heel rest and the supporting member are mounted for swinging movement about the axis of the shaft 792 and during such swinging movement the lower portion of the member 790 is supported by rollers 794, 794, Fig. 16, which ride on a thrust surface 796 on the platform 760. Formed integrally with the shaft 792 is a crank arm 798 which is provided with gear teeth 800 which are in mesh with teeth 802 cut on a rod 804 which is mounted for reciprocating movement in a bore 806, formed in a portion of the platform 760 and extends through clearance holes 807 in the frame, Fig. 12. Connected to this rod is one end of a link 810 the other end of which is adjustably secured, by means of a bushing 812, bolt 814 and clamp nut 815, Fig. 15, in a selected location along an arcuate groove 816 formed in a block 818, Fig. 12. This block is provided with a projecting spindle 820 which is rotatably mounted in suitable bearings supported by a portion of the machine frame 114 and keyed to this spindle is a lever arm 822 which is connected by means of a ball-and-socket joint 823 to one end of an adjustable link 824. The other end of the link 824 is connected to one arm of a bell-crank lever 826 and carried on the other arm of this lever is a cam roll 828.

Figure 20:
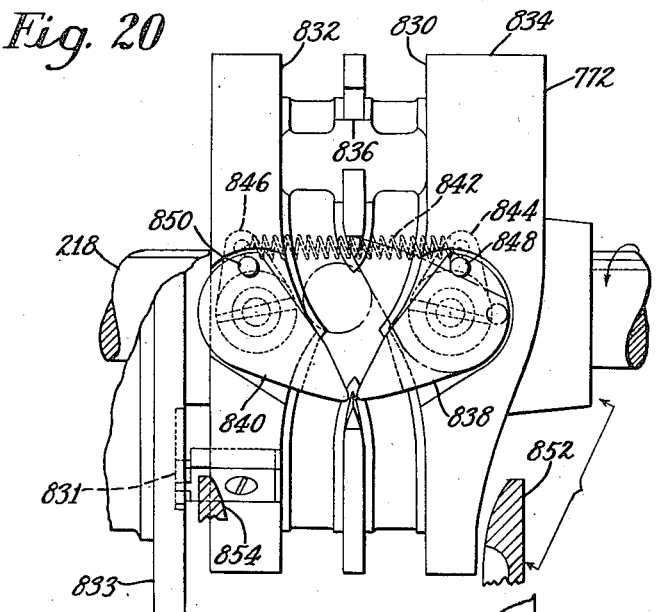
Fig. 20 is a plan view of a cam forming a part of the mechanism which is illustrated in Fig. 14.
Figure 21:
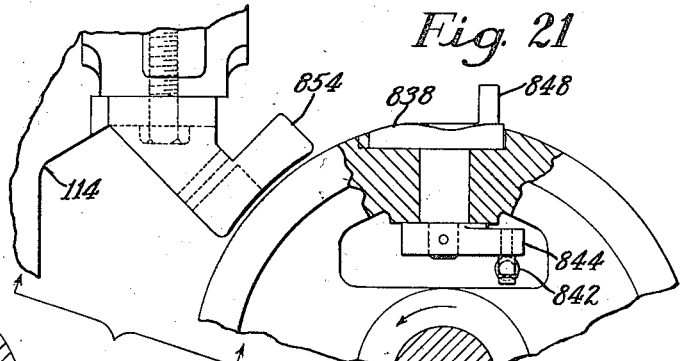
Fig. 21 is a view in side elevation with certain parts shown in section of a portion of the cam shown in Fig. 20.

This cam roll is adapted to run in one of two tracks 830, 832 formed in a barrel cam 834 which is connected by means of a frangible pin 831 to a disk 833 secured to the main drive shaft 218 and on one side of which the face cam 772 is cut, Fig. 14. Connecting these two cam tracks 830, 832 is an opening 836 which is in register with the cam roll 838 when the drive shaft is in its starting or stopping position (i. e., 0° or 360°), Fig. 20. Pivotally mounted in the periphery of the cam 834 are two gate or switch members 838, 840 which are adapted to be swung to the position in which the gate member 838 is shown in broken lines in Fig. 20 against the resistance of a coil spring 842, stretched between two arms 844, 846, associated, respectively, with these two gate members. Projecting upwardly from the gate members 838, 840, respectively, are pins 848, 850 which are adapted to be engaged, respectively, by cam-like abutments 852, 854, carried by the frame 114, for positively returning these members to the positions in which they are shown in solid lines, Fig. 21. As will be apparent, when the main drive shaft is rotated through successive complete turns, the cam roll 828 will travel first along one of the cam tracks 830, 832 and then along the other and the heel rest 112 will be swung laterally first to one side and then to the other of the central position in which it is shown in Fig. 12, as indicated by the dash lines R and L in this figure. Also, by changing the position of the bushing 812 along the arcuate guideway 817 in the block 818, the angular extent of the displacement of the heel rest from its central position may be increased or decreased.

Referring to Fig. 13, the block 818 is cut away at 860 and secured to its upper surface by means of screws 862, 862, Fig. 12, is a plate 864 and an operating handle 866. Pivoted between the block 818 and the plate 864 is a trunnion block 868 through which there projects one end of a rod 870 which is connected at its other end to a second trunnion block 872. This second trunnion block is pivoted on one arm of a lever 874 which is connected to a stud 876, journaled in a portion of the machine frame 114, Fig. 13. The other arm of this lever is provided with a slot 878 into which a pin 880 carried by the block 818 projects. Surrounding the rod 870 and interposed between the trunnion blocks 868, 872 is a compression spring 882. With this arrangement, the spring 882 tends to hold the heel rest in one or the other of its laterally displaced positions and provides a snap action as the heel rest passes the dead center position in which it is shown in Fig. 12. Thus this spring also holds the cam roll 828 against the outer side of one or the other of the cam tracks 830, 832 when the main drive shaft is in its starting or stopping position with the opening 836 in register with the cam roll. Accordingly, when the machine is stopped, the operator may swing the heel rest to its other laterally displaced position, i. e., to the right or to the left of the central position shown in Fig. 12 and thus transfer the cam roll to the other of the two cam tracks 830, 832 by manipulation of the hand lever 866. It will be understood, of course, that the heel rest never remains in the central position in which it is illustrated in Fig. 12 but merely passes through this position when it is being shifted to the right or to the left to lateral positions indicated by the dash lines R and L. The cam tracks 830, 832 are so disposed on the cam 834 that this lateral shifting action occurs during the latter portion of the second stage of the cycle of operations of the machine. After the machine has been started and during substantially the entire 360° rotation of the main drive shaft, the cam roll is confined in one or the other of the cam tracks 830, 832 so that the heel rest is held positively in one or the other of its laterally displaced positions during the operation of the machine.

Figure 16:
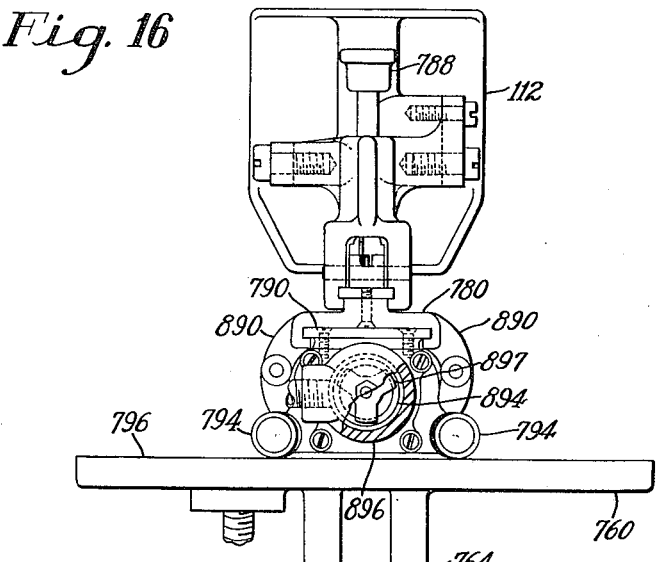
Fig. 16 is a view of a portion of the machine as seen looking in the direction of the arrow "B" of Fig. 14.
Figure 17:
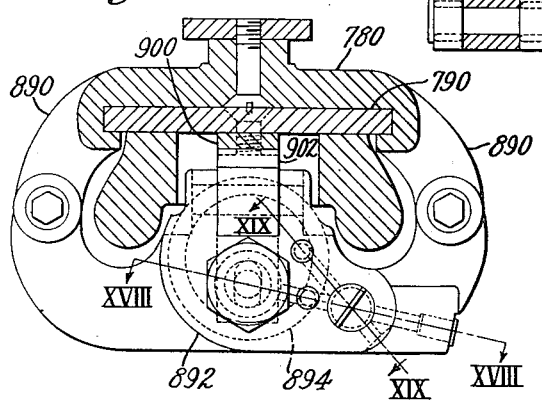
Fig. 17 is a view in section substantially on line XVII—XVII of Fig. 14 and looking in the direction of the arrows.
Figure 19:
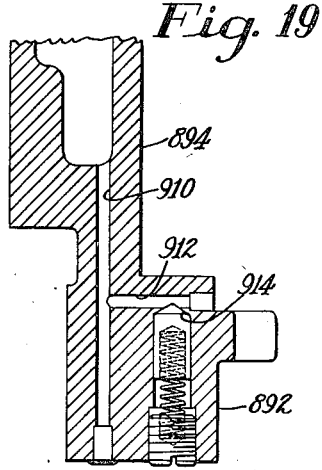
Fig. 19 is a view in section substantially on line XIX—XIX of Fig. 17 and looking in the direction of the arrows.
Figure 18:
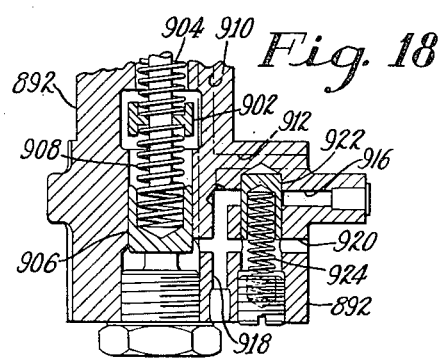
Fig. 18 is a view in section substantially on line XVIII—XVIII of Fig. 17 and looking in the direction of the arrows.

The slide member 780 has a pair of curved arms 890, 890 to which there is secured a block member 892 one end of which is shaped as a hollow piston 894, Figs. 14, 16 and 17. This piston is slidable in a cylinder 896 formed integrally with the supporting member 790 and is normally held in the retracted position in which it is shown in Fig. 14 and against a stop member 897 by means of a tension spring 898. Secured to the supporting member 790 is a ratchet bar 900 with which a locking pawl 902, pivoted on the block 892, is adapted to cooperate for locking the slide 780 against movement, relatively to the supporting member 790. This pawl is L-shaped and is swung in one direction to withdraw the pawl from engagement with the ratchet bar 900 by means of a compression spring 904, see Fig. 18. For swinging the pawl in the opposite direction to move it into engagement with the ratchet bar, a small piston 906, acting through a compression spring 908, is provided. Extending from within the hollow piston 894 is a passageway 910 which has a lateral branch 912, Figs. 18 and 19. This branch is connected, by means of a shouldered opening 914, Fig. 19, to a cross passageway 916 which is connected by means of passageways 918, 920 with the space behind the piston 906, Fig. 18. Cooperating with the shouldered opening 914 is a spring-pressed shut-off valve 922 which is provided with an exhaust port 924, Fig. 18.

With the arrangement so far described, when fluid under pressure, i. e., compressed air is admitted to the cylinder 896, as for example through a conduit 930, the piston 894 will be moved upwardly to bring the heel rest into engagement with the heel end of a shoe placed on the machine, the pawl 902 now being held out of engagement with the ratchet bar 900 by the action of the spring 904 since the space behind the piston 906 is at this time connected to exhaust through passageway 920 and the exhaust port 924 in the valve 922. When the heel rest seats firmly against the shoe, upward movement of which is prevented by the engagement of the toe end of the last with the toe gripper, the pressure of the fluid will build up in the cylinder 896 and hence in the passageways 910 and 912. Eventually this pressure will become sufficient to move the valve 922 to a position in which the exhaust through passage 920 and exhaust port 924 is closed and communication between passageways 912 and 916 effected. Now, the fluid under pressure will be admitted to the space behind the piston 906 and this piston will swing the pawl 902 in a direction to engage the ratchet bar 900, thereby locking the heel rest in position.

Referring to Fig. 26, the conduit 930 is adapted to be connected by means of a slide valve 932 to a conduit 934 which leads from a source of air under pressure to be described below. The valve 932 is connected to one arm of a lever 936, which is pivotally mounted on a bracket member 938 associated with a portion of the machine frame 114, and the other arm of this lever carries a cam roll 937 which is held against the periphery of a cam 940 by means of a compression spring 942. The cam 940 is keyed to one end of the main drive shaft 218 and is so shaped that, shortly after the machine has been started, the valve 932 will be shifted to the left, Fig. 26, to connect the conduit 930 with the conduit 934 and the heel rest will be moved into engagement with the heel end of a shoe in the machine. When the valve 932 is returned to its closed position, Fig. 26, at a later point in the cycle of operations of the machine, the conduit 930 is connected to an exhaust port 943 and the heel rest will therefore be released for return to its retracted position by the spring 898.

The shoe rest 108 and the heel rest 112 are in the positions in which they are shown in Fig. 14 at the beginning of each cycle of operations of the machine and the operator places the shoe to be pulled over on the shoe rest with the toe end of its last in engagement with the toe gripper 100, thereby positioning the shoe in a lengthwise direction. Early in the first stage of the cycle of operations, initiated in response to the depression of the treadle 122, the heel rest is moved upwardly and into engagement with the heel end of the shoe, which it moves to the proper lateral position, and is locked in position by the pawl 902. Next, the toe and side grippers close on the upper materials and commence their pulling actions. At the same time as the grippers commence to pull the upper over the last, the cam 772 becomes effective to rock the shoe rest 108 in a clockwise direction, Fig. 14, thereby forcing the last into the upper. Inasmuch as the heel rest is mounted on the shoe rest so as to partake of such rocking movement, the heel end of the shoe does not have any tendency to move relatively to the heel rest, and all danger of marking or otherwise marring the upper in this location is avoided. After the overlaying and fastener inserting devices 104, 106, 106 have operated to wipe the lasting margins of the upper materials inwardly over and to secure thereto the bottom of the shoe, during each second stage of the cycle of operations, the valve 932 is moved to its closed position and the heel rest 112 is retracted to its idle position by the spring 898. Shortly thereafter and just before the cycle of operations is completed, the heel rest is swung over to its other position by the action of the cam 834.

As has been suggested above, the main drive shaft 218 of the machine is rotated through approximately a half turn and then is brought to a stop, to provide an inspection or dwell period. Thereafter, the machine is again started and the drive shaft is caused to complete a full revolution. For thus operating the drive shaft there is keyed thereto a worm wheel 1000 which is in mesh with a worm 1002 keyed to a countershaft 1004, Figs. 3 and 23. This countershaft is journaled in suitable anti-friction bearings supported in a housing 1006 associated with a portion of the frame 114, and extends beyond the opposite sides of this housing. Rotatably mounted on one end of this shaft is a pulley 1008 which is driven, by means of belts 1010, from an electric motor 1012, Fig. 2. Splined on this end of the shaft is a clutch and brake disk 1014, Fig. 25, which is adapted to cooperate alternately with a friction drive surface 1016 on the pulley 1008 or with a friction brake surface 1018 on the housing 1006. A plurality of compression springs 1020 are arranged to urge the disk 1014 yieldingly in a direction to engage the drive surface 1016. For moving this disk in the opposite direction and into engagement with the brake surface 1018 there are interposed between the disk and an anti-friction thrust collar 1022 carried on the drive shaft 1004, a series of rods 1024 which are slidable through the hub portion of the pulley 1008, one of these rods appearing in Fig. 23. Pivotally mounted on a cross shaft 1026, supported in a bracket member 1028 associated with the frame 114, Fig. 24, is a lever having a bifurcated arm 1030 for engaging the thrust collar 1022, Fig. 23, and another arm 1032 provided with a radial recess 1034. Extending into this recess is a lateral projection 1036 connected to an arm 1038, Fig. 24, which is pivotally mounted on the shaft 1026 and which carries, at its upper end, a latch plate 1040, Fig. 23. Adjusting screws 1042, 1042 threaded through the arm 1032, are provided for varying the angular relationship between the arm 1038 and the arm 1032. Slidably mounted for vertical movement in a portion of the bracket member 1028 is a square rod 1044 provided with a hinged upper end portion 1046 which is yieldingly held in the position shown in Fig. 23 by means of a coil spring 1047. Resting on the latch plate 1040 is one end of a link 1048 to which there is secured a second latch plate 1050. The other end of this link is connected to one arm of a lever 1052 which is pinned to the outer end of a rockshaft 1054, journaled on and extending into the housing 1006. Also pinned to this rockshaft, within the housing, is an arm 1056 carrying a cam roll 1058 which is urged yieldingly into engagement with the periphery of a cam 1060 carried by the worm wheel 1000 and having two rise portions 1061, 1063, by means of a spring-pressed plunger 1059 which engages the other arm of the lever 1052.

Connected to the lower end of the rod 1044 is one end of a link 1062 the other end of which is connected to one arm of a bell-crank lever 1064. Extending between the other arm of this bell-crank lever and an arm on a second bell-crank lever 1066, Figs. 2 and 26, is a link 1068, and extending between the other arm of the bell-crank lever 1066 and an arm 1070 secured to a rockshaft 1071 journaled in bearings 1072, 1072 associated with the frame 114 is a link 1074. The treadle 122, Fig. 1, has a hub portion 1076 which is secured to the rockshaft 1071, Fig. 26, and a coil spring 1078, connected to the bell-crank lever 1066 tends to rotate this rockshaft in a direction to elevate the treadle 122 to the extent determined by a stop screw 1080 which engages a projection on the hub portion 1076 of this treadle, Fig. 26.

With the arrangement so far described, when the treadle 122 is depressed the rod 1044 will be elevated and the hinged upper end 1046 of this rod will lift the right-hand end of the link 1048, thereby disengaging the latch plates 1040, 1050 and releasing the disc 1014 to the action of the springs 1020. This disk will now be moved out of engagement with the brake surface 1018 and into engagement with the drive surface 1016 on the rotating pulley 1008 so that the drive shaft 218 will be driven in the direction of the arrow, Fig. 23. As the drive shaft rotates in this direction, the cam roll 1058 is held against the cam 1060 by the spring-pressed plunger 1059 and the link 1048 will be moved first to the left, as this roll descends from the rise 1061, and then to the right as the roll ascends the rise 1063. During movement of the link 1048 to the left, the latch plate 1050 will engage the latch plate 1040 so that when the link is subsequently moved to the right, the parts will be restored to the positions shown in Fig. 23 and the drive shaft 218 will be brought to a stop as a result of the engagement of the disk 1014 with the brake surface 1018. Upon a succeeding depression of the treadle, this same sort of an action will be repeated, the rises 1061, 1063 of the cam 1060 being so angularly disposed that upon initial depression of the treadle 122, the drive shaft is rotated approximately 155°, or nearly a half turn, and then brought to a stop, while upon the succeeding depression of this treadle, the drive shaft is rotated 205°, thus completing a full turn of the drive shaft in response to two successive depressions of the treadle 122.

As has been pointed out above, after the so-called dwell period provided by the bringing of the drive shaft to a stop at an intermediate point in its rotation, (i. e., at 155°), the operator may desire to rotate the drive shaft reversely in order to return the grippers which are operated during this initial stage of the cycle of operations, to their original positions. For this purpose, in the herein illustrated machine, the electric motor 1012, referred to above, and which is under the control of a main power switch 1090, Fig. 1, is of the reversible type and is adapted to be driven in a reverse direction upon the closing of a reversing switch 1092, Fig. 26, in response to the elevation of an operating plunger 1094, associated with the reversing switch. This operating plunger carries a roll 1096 at its lower end and this roll rides on a cam surface 1098, formed on a hub portion of the treadle 124. This cam is so shaped that when the treadle 124 is depressed against the resistance of a return spring 1100, the plunger 1094 is elevated and the reversing switch 1092 is closed. The treadle 124 carries an abutment screw 1102 which is in vertical alinement with an offset projection 1104 on the treadle 122. Hence, when the treadle 124 is depressed, the drive shaft 218 will be rotated reversely through a partial turn, of an extent determined by the angular relationship of the two rises 1061, 1063 on the cam 1066, and will be brought to a stop in its original angular position.

As will be readily understood, the only time in the complete cycle of operations of the machine when the drive shaft can thus be rotated reversely without possible damage to the work and/or to certain parts of the machine, is after the machine has been brought to a stop following the conclusion of the first stage in its cycle of operations. In order to prevent depression of the treadle 124 and reverse rotation of the drive shaft 218 except at this time in the operating cycle, there is pivotally mounted on a bracket 1110, by means of an eccentric bushing 1112, Fig. 27, a bell-crank lever 1114, one arm of which is shaped to provide a hook portion 1116. Connected to the other arm 1117 of this bell-crank lever is a coil spring 1118 which yieldingly swings the bell-crank lever 1114 in a counterclockwise direction, Fig. 26, and thereby holds the hook portion 1116 beneath the treadle 124 to lock this treadle against depression. Also connected to the arm 1117 of the bell-crank lever 1114 by means of a pair of links 1120, 1122, arms 1124, 1126 and a rockshaft 1128, is one arm of a lever 1130 which is pivotally mounted on a cross member 1132 associated with the frame 114, Fig. 26. The other arm of this lever carries a cam roll 1134 which is held against the periphery of a cam 1136, keyed to the main drive shaft 218, by means of a coil spring 1137. This cam is provided with a rise portion 1138 of relatively short angular extent and which is so disposed as to swing the bell-crank lever 1114 in a clockwise direction, thereby releasing the treadle 124, at the desired time during the cycle of operations of the machine, i. e., just as the machine comes to a stop at the conclusion of the first stage of its cycle of operations. Immediately after the final stage of the cycle of operations has been initiated, as a result of a second depression of the treadle 122, the rise portion 1138 passes beyond the roll 134 and the parts are restored to the positions shown in Fig. 26. As an additional safety measure, the reversing switch 1092 is energized through an auxiliary switch 1140. This auxiliary switch has an operating arm 1142 which carries a roll 1144 and this roll rests on a boss 1146, formed on the lever 1130. When the parts are in the positions shown in Fig. 26, the lever 1130 holds the arm 1142 in a position to open the auxiliary switch and thereby deenergizes the reversing switch 1092. Accordingly, if for any reason the hook portion 1116 failed to reengage the treadle 124, a depression of the treadle would be ineffective to cause reverse rotation of the drive shaft.

Figure 2:
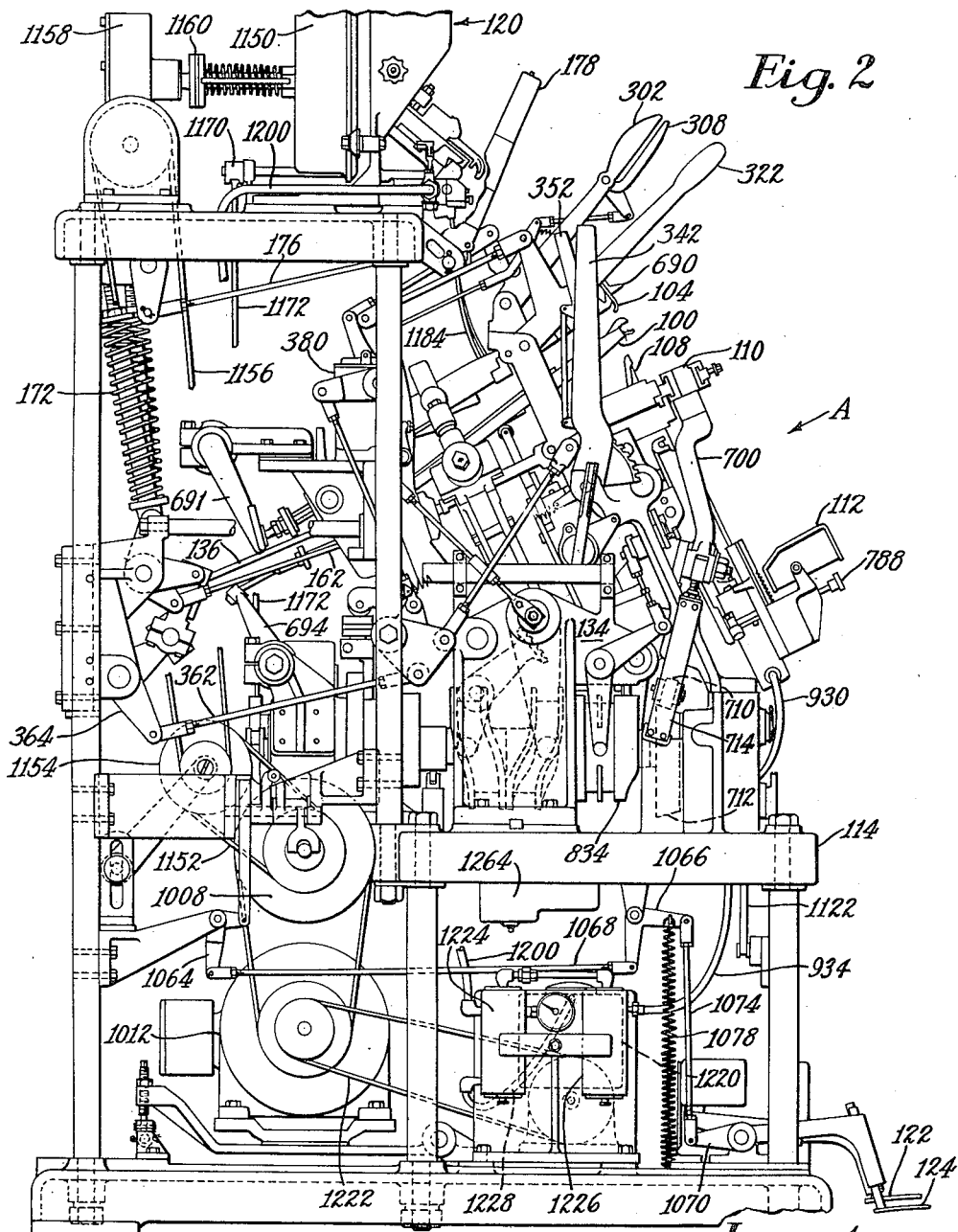
Fig. 2 is a view in side elevation, with certain parts of the frame construction omitted, of the machine illustrated in Fig. 1.

The tack supplying and separating mechanism 120 may be of any desired construction and includes a tack pot 1150 which is continuously rotated from the pulley 1008, Fig. 23, by means of a belt 1152, idle pulley 1154, belt 1156, reduction gearing indicated generally by reference character 1158 and a yielding drive coupling 1160, Fig. 2. Associated with this tack supplying and separating mechanism is a reciprocable tack separator 1162 of conventional construction and provided on one of its ends with rack teeth 1164 which are in mesh with a gear quadrant 1165 formed on one arm of a lever 1166, Fig. 28. This lever is secured on one end of a shaft 1167 which is journaled in bearing brackets 1168 mounted on the upper part of the frame 114, and secured to the other end of the shaft is an arm 1170. Connected to this arm is a link 1172 which extends downwardly with the frame and is connected at its lower end to one arm of a lever 1174, journaled on the housing 1006, Fig. 23. The other arm of this lever carries a cam roll 1176 which is held against a cam 1178 by means of a spring-pressed plunger 1180. This cam is so shaped that at the very beginning of the second stage of the cycle of operations, after the dwell period, the separator 1162 is moved to the left to pick up a load of tacks which will be separated and dropped into the tubes during the succeeding cycle of operations, and just before the completion of the operating cycle the separator is moved to the right, Fig. 28, to discharge the load of tacks previously separated, and to cause these tacks to drop through passageways 1182 and into seven tack tubes 1184 which extend between the separating mechanism and the toe and side tackers.

In vertical alinement with the separator 1162 and the passageways 1182 is a cross bore 1186 in which there is slidingly mounted a plunger or gate member 1188. Extending vertically through this gate member are a plurality of passageways 1190 which are in alinement with the passageways 1182 when the gate member is in the position in which it is shown in Fig. 28. This gate member is operatively connected to the lever 1166 and hence is reciprocated in time relation with the separator in a direction opposite to the reciprocating movements of the separator 1162. To the left of each vertical passageway 1190 in the gate member 1188 is an angular passageway 1192 having a horizontal branch extending rearwardly to the wall of the bore 1186 and a vertical branch extending downwardly to the wall of this bore. Directly in back of the bore 1186 there is a parallel and slightly smaller bore 1194 and extending between these two bores are a plurality of horizontal passageways 1196. Connected to the left hand end of the bore 1194, which is closed at its opposite end, is a conduit 1200 in which there is interposed a valve 1202. This valve has an operating plunger 1204 and is held closed by a spring, not shown, when the parts are in the positions shown in Fig. 28, i. e., when the machine is idle. Associated with the valve 1202 is a bell crank lever 1206 which is actuated, by means of a slotted link 1208 connected to the separator, to open the valve 1202 when the separator is moved to the left at the beginning of the second stage of each cycle of operations. The conduit 1200 is connected to a source of compressed air under pressure which is about to be described. Accordingly, when the valve 1200 is opened as a result of movement of the separator 1162 to the left, air under pressure will be admitted to the bore 1164 and since, at this time, the passageways 1192 in the gate member 1188 are in horizontal alinement with the passageways 1196, air under pressure will be admitted to each of the tack tubes 1184 and the tacks which were separated and dropped into these tubes during the latter part of the previous cycle of operations will be blown upwardly from the low points of these tubes into the driver passages of the toe and side tackers.

Figure 22:
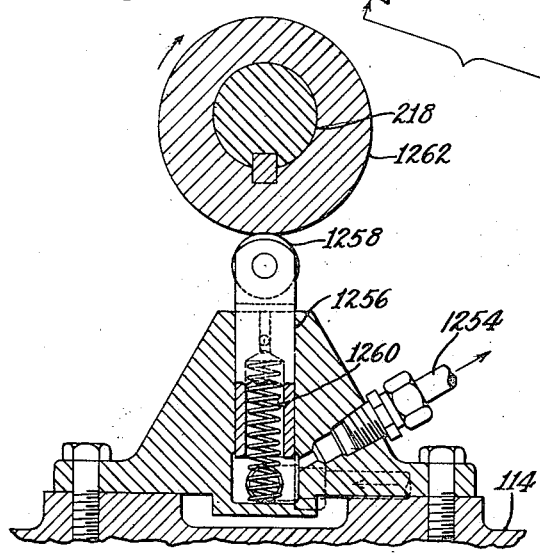
Fig. 22 is a view in section substantially on line XXII—XXII of Fig. 3 and looking in the direction of the arrows.

Referring to Fig. 2, an air compressor 1220 of conventional construction is mounted in the lower part of the frame 114, and this air compressor is driven from the motor 1012 by means of a belt 1222. This air compressor discharges into two similar interconnected accumulators 1224, 1226 through a pipe 1228. The conduit 934, previously referred to, is connected to one of these accumulators while the conduit 1200 is connected to the other. Thus, while the electrical motor is in operation, these conduits will be supplied with air under pressure. Supported above the housing 134, Fig. 3, is a pipe 1250 having a plurality of apertures 1252 therein and connected to this pipe is a smaller pipe 1254, which extends downwardly and is connected at its lower end to the discharge outlet of an oil pump having a plunger 1256, see Fig. 22. This plunger carries a roll 1258 which is urged upwardly by a spring 1260 into engagement with an eccentric 1262 secured to the main drive shaft 218. The inlet of this oil pump is connected to an oil reservoir 1264 associated with the frame of the machine, Fig. 3. Thus during the operation of the main drive shaft, the lubricating oil is continuously delivered by the pump to the pipe 1250 and drips from the apertures 1252 onto the various moving parts associated with this housing. At the end opposite to that on which the pulley 1008 is mounted, Fig. 23, a bevel pinion 1270 is secured to the shaft 1004. Rotatably and slidably supported in suitable bearings, not shown, is a crank shaft 1272 having secured to one of its ends a bevel gear 1274. The other end of this shaft is accessible through an opening in the frame 114, see Fig. 1, and is provided with a cross pin 1276 for engaging a hand crank. This shaft is normally urged, by means of a spring, not shown, in a direction to disengage the gear 1274 from the pinion 1270. However, when it is desired to turn the machine over by hand, the operator can apply the hand crank to the shaft 1272 and, by pushing this shaft rearwardly, he can cause the gear 1274 to mesh with the pinion 1270 for this purpose.

Having described the invention, what we claim as new and desire to secure by Letters Patent of the United States is:

1. In a machine for shaping uppers over lasts, a plurality of grippers for pulling an upper over a last respectively at the toe end and at the opposite sides of the last in a cycle of power operations of the machine, power means for operating the grippers including a spring associated with each of said grippers and operable during said cycle of operations to apply a pulling force to its associated gripper, a common support for said springs, and manually operable means for changing the position of said support to vary the intensity of the pulling forces applied to the grippers by said springs.

2. In a machine for shaping uppers over lasts, a plurality of grippers for pulling an upper over a last respectively at the toe end and at the opposite sides of the last in a cycle of power operations of the machine, a spring associated with each of said grippers and operable during said cycle of operations to apply a pulling force to its associated gripper, a common support for said springs comprising a bell-crank lever having a plurality of arms to which said springs are respectively connected, and manually operable means for swinging said bell-crank lever to and for holding it in different angular positions to vary the intensity of the pulling forces applied to the grippers by said springs.

3. In a machine for shaping uppers over lasts, a plurality of grippers for pulling an upper over a last respectively at the toe end and at the opposite sides of the last in a cycle of power operations of the machine, a spring associated with each of said grippers and operable during said cycle of operations to apply a pulling force to its associated gripper, a common support for said springs comprising a bell-crank lever having a plurality of arms to which said springs are respectively connected, means including a manually operable hand lever connected to said bell-crank lever for swinging it to and for holding it in different angular positions to vary the intensity of the pulling forces applied to the grippers by said springs, and locking means for holding the hand lever in different positions.

4. In a machine for shaping uppers over lasts, a toe gripper for pulling an upper over a last at the toe end of the last, a pair of side grippers for pulling the upper over the last at the opposite sides of the last, power means for operating said grippers including a spring associated with each of said grippers and operable in a cycle of power operations of the machine to apply a pulling force to its associated gripper, a common support for said springs, and manually operable means for changing the position of said support to vary the intensity of the pulling forces applied to the grippers by said springs.

5. In a machine for shaping uppers over lasts, a toe gripper for pulling an upper over a last at the toe end of the last, a pair of side grippers for pulling the upper over the last at the opposite sides of the last, a spring associated with each of said grippers and operable in a cycle of power operations of the machine to apply a pulling force to its associated gripper, a common support for said springs comprising a bell-crank lever having three arms to which said springs are respectively connected, and manually operable means for swinging said bell-crank lever to and for holding it in different angular positions to vary the intensity of the pulling forces applied to the grippers by said springs.

6. In a machine for shaping uppers over lasts, a toe gripper for pulling an upper over a last at the toe end of the last, a pair of side grippers for pulling the upper over the last at the opposite sides of the last, a spring associated with each of said grippers and operable in a cycle of power operations of the machine to apply a pulling force to its associated gripper, a common support for said springs comprising a bell-crank lever having a plurality of arms to which said springs are respectively connected, means including a manually operable hand lever connected to said bell-crank lever for swinging it to and for holding it in different angular positions to vary the intensity of the pulling forces applied to the grippers by said springs, and locking means for holding the hand lever in different positions.

7. In a machine for shaping uppers over lasts, a toe gripper for pulling an upper over a last at the toe end of the last, a pair of side grippers for pulling the upper over the last at the opposite sides of the last, a spring associated with each of said grippers and operable in a cycle of power operations of the machine to apply a pulling force to its associated gripper, a common support for said springs comprising a bell-crank lever having three arms to which said springs are respectively connected, and manually operable means for swinging said bell-crank lever to and for holding it in different angular positions to vary the intensity of the pulling forces applied to the grippers by said springs, the arm to which the spring associated with said toe gripper is connected being of shorter length than the other two arms of the bell-crank lever.

8. In a machine for shaping uppers over lasts, a toe gripper for pulling an upper over a last at the toe end of the last, a pair of side grippers for pulling the upper over the last at the opposte sides of the last, a spring associated with each of said grippers and operable in a cycle of power operations of the machine to apply a pulling force to its associated gripper, a common support for said springs comprising a bell-crank lever having three arms to which said springs are respectively connected, means including a manually operable hand lever connected to said bell-crank lever for swinging it to and for holding it in different angular positions to vary the intensity of the pulling forces applied to the grippers by said springs, and locking means for holding the hand lever in different positions, the arm to which the spring associated with the toe gripper is connected being of shorter length than the other two arms of the bell-crank lever.

9. In a machine for shaping uppers over lasts, a plurality of grippers for pulling an upper over a last in a cycle of power operations of the machine, a spring associated with each of said grippers and operable during said cycle of operations to exert a pulling force on its associated gripper, a plurality of bell-crank levers each having an arm connected to one of said springs and a second arm connected to one of said grippers, the arms of said bell-crank levers being so disposed angularly to the line of action of its associated spring and to the direction of movement of the gripper connected thereto that the intensities of the pulling forces applied to the grippers by said springs remain substantially constant through the range of movement of said grippers.

10. In a machine for shaping uppers over lasts, a toe gripper for pulling an upper over a last at the toe end of the last, a pair of side grippers for pulling the upper over the last at the opposite sides of the last, in a cycle of power operations of the machine, a spring associated with each of said grippers and operable during said cycle of operations to apply a pulling force to its associated gripper, a plurality of bell-crank levers each having an arm connected to one of said springs and a second arm connected to one of said grippers, the arms of said bell-crank levers being so disposed angularly to the line of action of its associated spring and to the direction of movement of the gripper connected thereto that the intensities of the pulling forces applied to the grippers by said springs remain substantially constant throughout the range of movement of said grippers.

11. In a machine for shaping uppers over lasts, a plurality of grippers for pulling an upper over a last in a cycle of power operations of the machine, means for operating said grippers including a plurality of gripper-operating levers each fulcrumed at one end on a fixed support, and on operating link connected to each of said levers between its ends, and means for manually moving said grippers comprising a plurality of bell-crank levers each having a relatively long arm providing an operating handle and a shorter arm directly connected to a gripper-operating lever at the end opposite to that on which said lever is fulcrumed.

12. In a machine for shaping uppers over lasts, a plurality of grippers for pulling an upper over a last in a cycle of power operations of the machine, an updraw lever associated with each gripper and fulcrumed at one of its ends on a fixed support, an operating link connected to each of said updraw levers between its opposite ends, a gripper-operating spring adapted to apply a pulling force to each of said updraw levers during said cycle of operations, means for manually displacing each of said grippers in either direction while it is under the influence of its associated spring including a bell-crank lever having a relatively long arm providing an operating handle and a shorter arm directly connected to the updraw lever associated with the gripper at the end opposite to that on which the updraw lever is fulcrumed.

13. In a machine for shaping uppers over lasts, means for shaping the forepart of a shoe upper over its last in a cycle of power operations of the machine, a heel rest movable lengthwise of the shoe into engagement with the upper at the heel end of the shoe for determining the position of that end of the shoe laterally prior to the operation of the upper-shaping means, a support for said heel rest movable to displace the heel rest laterally to one or the other of two different predetermined positions for right and left shoes respectively, and a double track cam for positively displacing the heel rest from one of its positions to the other at the conclusion of each cycle of operations of the machine.

14. In a machine for shaping uppers over lasts, means for shaping the forepart of a shoe upper over its last in a cycle of power operations of the machine, a heel rest movable lengthwise of the shoe into engagement with the upper at the heel end of the shoe for determining the position of that end of the shoe laterally prior to the operation of the upper-shaping means, a support for said heel rest movable to displace the heel rest laterally to one or the other of two different predetermined positions for right and left shoes respectively, a double track cam for positively displacing the heel rest from one of its positions to the other at the conclusion of each cycle of operations, means including a cam roll cooperating with said cam for thus displacing the heel rest, and manually operable means for selectively transferring the cam roll from one of said tracks to the other after said cycle of operations has been completed.

15. In a machine for shaping uppers over lasts, means for shaping the forepart of a shoe upper over its last in a cycle of power operations of the machine, a heel rest movable lengthwise of the shoe into engagement with the upper at the heel end of the shoe for determining the position of that end of the shoe laterally prior to the operation of the upper-shaping means, a support for said heel rest movable to displace the heel rest laterally to one or the other of two different predetermined positions for right and left shoes respectively, power-operated means for positively displacing the heel rest from one of its positions to the other at the conclusion of said cycle of operations of the machine, and means for changing the effect of said power-operated means to vary the extent of lateral displacement of the heel rest to accommodate shoes on lasts of different styles.

16. In a machine for shaping uppers over lasts, means for shaping the forepart of a shoe upper over its last in a cycle of power operations of the machine, a heel rest movable lengthwise of the shoe into engagement with the upper at the heel end of the shoe for determining the position of that end of the shoe laterally prior to the operation of the upper-shaping means, a support for said heel rest movable to displace the heel rest laterally to one or the other of two different predetermined positions for right and left shoes respectively, a double track cam for positively displacing the heel rest from one of its positions to the other at the conclusion of said cycle of operations of the machine, and means for changing the effect of said cam to vary the extent of lateral displacement of the heel rest to accommodate shoes on lasts of different styles.

17. In a machine for shaping uppers over lasts, means for shaping the forepart of a shoe upper over its last in a cycle of power operations of the machine, a heel rest movable lengthwise of the shoe into engagement with the upper at the heel end of the shoe for determining the position of that end of the shoe laterally prior to the operation of the upper-shaping means, a support for said heel rest movable to displace the heel rest laterally to one or the other of two different predetermined positions for right and left shoes respectively, a double track cam for positively displacing the heel rest from one of its positions to the other at the conclusion of said cycle of operations of the machine, means for changing the effect of said cam to vary the extent of lateral displacement of the heel rest to accommodate shoes on lasts of different styles, means including a cam roll cooperating with said cam for thus displacing the heel rest, and manually operable means for selectively transferring said cam roll from one of said tracks to the other after said cycle of operations has been completed.

18. In a machine for shaping uppers over lasts, a plurality of grippers for pulling an upper over a last respectively at the toe end and opposite sides of the last in a cycle of power operations of the machine, a heel rest mounted for movement lengthwise of the shoe into engagement with the upper at the heel end of the shoe for determining the position of that end of the shoe laterally prior to the operation of said grippers, fluid-pressure-operated means for moving the heel rest into engagement with the shoe, and means operable in response to the building up of fluid pressure as a result of the engagement of the heel rest with the shoe for mechanically locking the heel rest against movement during the operation of said grippers.

19. In a machine for shaping uppers over lasts, a plurality of grippers for pulling an upper over a last respectively at the toe end and opposite sides of the last in a cycle of power operations of the machine, a heel rest mounted for movement lengthwise of the shoe into engagement with the upper at the heel end of the shoe for determining the position of that end of the shoe laterally prior to the operation of said grippers, fluid-pressure-operated means for moving the heel rest into engagement with the shoe, a pawl for mechanically locking the heel rest against movement, spring means for releasing the pawl, and means operable in response to the building up of fluid pressure as a result of the engagement of the heel rest with the shoe for operating the pawl to lock the heel rest against movement during the operation of said grippers.

20. In a machine for shaping uppers over lasts, a plurality of grippers for pulling an upper over a last respectively at the toe end and at the opposite sides of the last in a cycle of power operations of the machine, means for wiping the lasting margin inwardly over and for securing it to the bottom of the shoe at the toe end and at the opposite sides of the shoe during said cycle of operations after it has been pulled over the last by said grippers, a heel rest mounted for movement lengthwise of the shoe into engagement with the upper at the heel end of the shoe for determining the position of that end of the shoe laterally prior to the operation of said grippers and said wiping and securing means, fluid-pressure-operated means for moving the heel rest into engagement with the shoe, and means operable in response to the building up of fluid pressure as a result of the engagement of the heel rest with the shoe for mechanically locking the heel rest against movement during the operation of said grippers and said wiping and securing means.

21. In a machine for shaping uppers over lasts, a plurality of grippers for pulling an upper over a last respectively at the toe end and at the opposite sides of the last in a cycle of power operations of the machine, means for wiping the lasting margin inwardly over and for securing it to the bottom of the shoe at the toe end and at the opposite sides of the shoe during said cycle of operations after it has been pulled over the last by said grippers, a heel rest mounted for movement lengthwise of the shoe into engagement with the upper at the heel end of the shoe for determining the position of that end of the shoe laterally prior to the operation of said grippers and said wiping and securing means, fluid-pressure-operated means for moving the heel rest into engagement with the shoe, a pawl for mechanically locking the heel rest against movement, spring means for releasing the pawl, and means operable in response to the building up of fluid pressure as a result of the engagement of the heel rest with the shoe for operating the pawl to lock the heel rest against movement during the operation of said grippers and said wiping and securing means.

22. In a machine for shaping uppers over lasts, a plurality of grippers for pulling an upper over a last respectively at the toe end and at the opposite sides of the last in a cycle of power operations of the machine, a shoe rest for supporting the last during the operation of the machine mounted for pivotal movement about an axis extending transversely of a shoe suported thereon, a heel rest support mounted on the shoe rest for pivotal movement about an axis extending heightwise of the shoe, a heel rest movable on said support lengthwise of the shoe into engagement with the upper at the heel end of the shoe for positioning that end of the shoe laterally prior to the operation of said grippers, and power-operated means for rocking said shoe rest and heel rest as a unit about said first-mentioned axis in a direction to force the last into the upper of the shoe during said cycle of operations of the machine.

23. In a machine for shaping uppers over lasts, a plurality of grippers for pulling an upper over a last respectively at the toe end and at the opposite sides of the last in a cycle of power operations of the machine, a shoe rest for supporting the last during the operation of the machine mounted for pivotal movement about an axis extending transversely of a shoe supported thereon, a heel rest support mounted on the shoe rest for pivotal movement about an axis extending heightwise of the shoe, a heel rest movable on said support lengthwise of the shoe into engagement with the upper at the heel end of the shoe for positioning that end of the shoe laterally prior to the operation of said grippers, power-operated means for positively swinging the heel rest support about said last-mentioned axis to displace the heel rest laterally to one or the other of two different positions for right and left shoes respectively at the conclusion of said cycle of operations, and power-operated means for rocking said shoe rest and heel rest as a unit about said first-mentioned axis in a direction to force the last into the upper of the shoe during said cycle of operations of the machine.

24. In a machine for shaping uppers over lasts, a plurality of grippers for pulling an upper over a last respectively at the toe end and at the opposite sides of the last in a cycle of power operations of the machine, a shoe rest for supporting the last during the operation of the machine mounted for pivotal movement about an axis extending transversely of a shoe supported thereon, a heel rest support mounted on the shoe rest for pivotal movement about an axis extending heightwise of the shoe, a heel rest movable on said support lengthwise of the shoe into engagement with the upper at the heel end of the shoe for positioning that end of the shoe laterally prior to the operation of said grippers, power-operated means for positively swinging the heel rest support about said last-mentioned axis to displace the heel rest laterally to one or the other of two different positions for right and left shoes respectively at the conclusion of said cycle of operations, means for changing the effect of said power-operated means to vary the extent of the lateral displacement of the heel rest to accommodate shoes on lasts of different styles, and power-operated means for rocking said shoe rest and heel rest as a unit about said first-mentioned axis in a direction to force the last into the upper of the shoe during said cycle of operations of the machine.

25. In a machine for shaping uppers over lasts, a plurality of grippers for pulling an upper over a last respectively at the toe end and at the opposite sides of the last in a cycle of power operations of the machine, a shoe rest for supporting the last during the operation of the machine mounted for pivotal movement about an axis extending transversely of a shoe supported thereon, a heel rest support mounted on the shoe rest for pivotal movement about an axis extending heightwise of the shoe, a heel rest movable on said support lengthwise of the shoe into engagement with the upper at the heel end of the shoe for positioning that end of the shoe laterally prior to the operation of said grippers, a double track cam for positively displacing the heel rest laterally to one or the other of two different positions for right and left shoes respectively at the conclusion of each cycle of operations of the machine, and power-operated means for rocking said shoe rest and heel rest as a unit about said first-mentioned axis in a direction to force the last into the upper of the shoe during said cycle of operations of the machine.

26. In a machine for shaping uppers over lasts, a plurality of grippers for pulling an upper over a last respectively at the toe end and at the opposite sides of the last in a cycle of power operations of the machine, a shoe rest for supporting the last during the operation of the machine mounted for pivotal movement about an axis extending transversely of a shoe supported thereon, a heel rest support mounted on the shoe rest for pivotal movement about an axis extending heightwise of the shoe, a heel rest movable on said support lengthwise of the shoe into engagement with the upper at the heel end of the shoe for positioning that end of the shoe laterally prior to the operation of said grippers, a double track cam for positively displacing the heel rest laterally to one or the other of two different positions for right and left shoes respectively at the conclusion of each cycle of operations, means including a cam roll cooperating with said cam for thus displacing the heel rest, manually operable means for selectively transferring the cam roll from one of said tracks to the other after said cycle of operations has been completed, and power-operated means for rocking said shoe rest and heel rest as a unit about said first-mentioned axis in a direction to force the last into the upper of the shoe during said cycle of operations of the machine.

27. In a machine for shaping uppers over lasts, a plurality of grippers for pulling an upper over a last respectively at the toe end and at the opposite sides of the last in a cycle of power operations of the machine, means for operating said grippers including a drive shaft, an electric motor for rotating the drive shaft, a manually operable clutch for connecting said motor to the drive shaft, means for automatically releasing the clutch and stopping the rotation of the drive shaft at the end of one stage of a cycle of operations of the machine when the grippers are holding the upper under tension, a normally open switch for reversing the direction of rotation of said motor, and a manually operable member for engaging the clutch and closing the reversing switch to cause said drive shaft to be rotated reversely to its starting position.

28. In a machine for shaping uppers over lasts, a plurality of grippers for pulling an upper over a last respectively at the toe end and at the opposite sides of the last in a cycle of power operations of the machine, means for operating said grippers including a drive shaft, an electric motor for rotating the drive shaft, a clutch and brake mechanism for alternately connecting said motor to the drive shaft and for stopping the rotation of the drive shaft, control mechanism including a foot treadle for releasing the brake and for engaging the clutch to start the rotation of said drive shaft, and means for automatically releasing the clutch and for setting the brake to stop the rotation of the drive shaft at the end of one stage of a cycle of operations of the machine when the grippers are holding the upper under tension, a normally open switch for reversing the direction of rotation of said motor, and a second foot treadle for operating said control mechanism and for closing the reversing switch to cause said drive shaft to be rotated reversely to its starting position.

29. In a machine for shaping uppers over lasts, a plurality of grippers for pulling an upper over a last respectively at the toe end and at the opposite sides of the last in a cycle of power operations of the machine, means for operating said grippers including a drive shaft, an electric motor for rotating the drive shaft, a manually operable clutch for connecting said motor to the drive shaft, means for automatically releasing the clutch and for stopping the rotation of the drive shaft at the end of one stage of a cycle of operations of the machine when the grippers are holding the upper under tension, a normally open switch for reversing the direction of rotation of said motor, a manually operable member for engaging the clutch and for closing the reversing switch to cause said drive shaft to be rotated reversely to its starting position, means for engaging said manually movable member and for normally holding it against movement, and means associated with said drive shaft for withdrawing said means from engagement with the manually operable member to release it for movement when the drive shaft is stopped at the conclusion of said one stage of a cycle of operations of the machine.

30. In a machine for shaping uppers over lasts, a plurality of grippers for pulling an upper over a last respectively at the toe end and at the opposite sides of the last in a cycle of power operations of the machine, means for operating said grippers including a drive shaft, an electric motor for rotating the drive shaft, a manually operable clutch for connecting said motor to the drive shaft, means for automatically releasing the clutch and for stopping the rotation of the drive shaft at the end of one stage of a cycle of operations of the machine when the grippers are holding the upper under tension, a normally open switch for reversing the direction of rotation of said motor, a manually operable member for engaging the clutch and for closing the reversing switch to cause said drive shaft to be rotated reversely to its starting position, a latch member for engaging said manually operable member for normally holding it against movement, and cam means associated with said drive shaft for withdrawing said latch from engagement with the manually operable member to release it for movement when the drive shaft is stopped at the conclusion of said one stage of a cycle of operations of the machine.

31. In a machine for shaping uppers over lasts, a plurality of grippers for pulling an upper over a last respectively at the toe end and at the opposite sides of the last in a cycle of power operations of the machine, means for operating said grippers including a drive shaft, an electric motor for rotating the drive shaft, a clutch and brake mechanism for alternately connecting said motor to the drive shaft and for stopping the rotation of the drive shaft, control mechanism including a foot treadle for releasing the brake and for engaging the clutch to start the rotation of said drive shaft and means for automatically releasing the clutch and for setting the brake to stop the rotation of the drive shaft at the end of one stage of a cycle of operations of the machine when the grippers are holding the upper under tension, a normally open switch for reversing the direction of rotation of said motor, a second foot treadle for operating said control mechanism and for closing the reversing switch to cause said drive shaft to be rotated reversely to its starting position, means for engaging said second foot treadle and for normally holding it against movement, and means associated with said drive shaft for withdrawing said means from engagement with the second foot treadle to release it for movement when the drive shaft is stopped at the conclusion of said one stage of a cycle of operations of the machine.

32. In a machine for shaping uppers over lasts, a plurality of grippers for pulling an upper over a last respectively at the toe end and at the opposite sides of the last in a cycle of power operations of the machine, means for operating said grippers including a drive shaft, an electric motor for rotating the drive shaft, a clutch and brake mechanism for alternately connecting said motor to the drive shaft and for stopping the rotation of the drive shaft, control mechanism including a foot treadle for releasing the brake and for engaging the clutch to start rotation of said drive shaft, and means for automatically releasing the clutch and for setting the brake to stop the rotation of the drive shaft at the end of one stage of a cycle of operations of the machine when the grippers are holding the upper under tension, a normally open switch for reversing the direction of rotation of said motor, a second foot treadle for operating said control mechanism and for closing the reversing switch to cause said drive shaft to be rotated reversely to its starting position, a latch member for engaging said second-named foot treadle and for normally holding it against movement, and cam means associated with said drive shaft for withdrawing said latch from engagement with the second foot treadle to release it for movement when the drive shaft is stopped at the conclusion of said one stage of a cycle of operations of the machine.

33. In a machine for shaping uppers over lasts, a plurality of grippers for pulling the upper of a shoe over a last respectively at the toe end and at the opposite sides of the last in an initial stage of a cycle of power operations of the machine, a plurality of overlaying and fastener-inserting devices operable during a subsequent stage in the cycle of operations to lay the lasting margin of the upper inwardly over and to secure it to the bottom of the shoe, fastener separating mechanism, conduits for conveying fasteners from said separating mechanism to said overlaying and fastener-inserting devices, and means operable to introduce a blast of air under pressure into said conduits to move fasteners therein to said fastener-inserting devices at the beginning of said subsequent stage in the cycle of operations of the machine.

34. In a machine for shaping uppers over lasts, a plurality of grippers for pulling the upper of a shoe over a last respectively at the toe end and at the opposite sides of the last in an initial stage of a cycle of power operations of the machine, a plurality of overlaying and fastener-inserting devices operable during a subsequent stage in the cycle of operations to lay the lasting margin of the upper inwardly over and to secure it to the bottom of the shoe, fastener separating mechanism, conduits for conveying fasteners from said separating mechanism to said overlaying and fastener-inserting devices, a source of air under pressure, a valve for connecting said source to said conduits, and means for opening said valve to admit air under pressure to said conduits for moving fasteners therein to said fastener-inserting devices at the beginning of said subsequent stage in the cycle of operations of the machine.

35. In a machine for shaping uppers over lasts, a plurality of grippers for pulling the upper of a shoe over a last respectively at the toe end and at the opposite sides of the last in an initial stage of a cycle of power operations of the machine, a plurality of overlaying and fastener-inserting devices operable during a subsequent stage in the cycle of operations to lay the lasting margin of the upper inwardly over and to secure it to the bottom of the shoe, fastener separating mechanism, conduits for conveying fasteners from said separating mechanism to said overlaying and fastener-inserting devices, a source of air under pressure, a valve for connecting said source to said conduits, and a cam for opening said valve to admit air under pressure to said conduits for moving fasteners therein to said fastener-inserting devices at the beginning of said subsequent stage in the cycle of operations of the machine.

36. In a machine for shaping uppers over lasts, a plurality of grippers for pulling the upper of a shoe over a last respectively at the toe end and at the opposite sides of the last in an initial stage of a cycle of power operations of the machine, a plurality of overlaying and fastener-inserting devices operable during a subsequent stage in the cycle of operations to lay the lasting margin of the upper inwardly over and to secure it to the bottom of the shoe, a fastener separating mechanism having a reciprocable separating member, conduits extending between the separating mechanism and said fastener-inserting devices and adapted to receive fasteners separated by said separating member, means for operating said separating member to separate fasteners during the latter part of the subsequent stage in each cycle of operations of the machine, and means operable to introduce a blast of air under pressure into said conduits at the beginning of said subsequent stage in each cycle of operations to move fasteners therein separated during a previous cycle of operations to said fastener-inserting devices.

37. In a machine for shaping uppers over lasts, a plurality of grippers for pulling the upper of a shoe over a last respectively at the toe end and at the opposite sides of the last in an initial stage of a cycle of power operations of the machine, a plurality of overlaying and fastener-inserting devices operable during a subsequent stage in the cycle of operations to lay the lasting margin of the upper inwardly over and to secure it to the bottom of the shoe, a fastener separating mechanism having a reciprocable separating member, conduits extending between the separating mechanism and said fastener-inserting devices and adapted to receive fasteners separated by said separating member, means for operating said separating member to separate fasteners during the latter part of the subsequent stage in each cycle of operations of the machine, a source of air under pressure, a valve for connecting said source to said conduits, and means for opening said valve to admit air under pressure into said conduits at the beginning of said subsequent stage in each cycle of operations to move fasteners therein separated during a previous cycle of operations to said fastener-inserting devices.

38. In a machine for shaping uppers over lasts, a plurality of grippers for pulling the upper of a shoe over a last respectively at the toe end and at the opposite sides of the last in an initial stage of a cycle of power operations of the machine, a plurality of overlaying and fastener-inserting devices operable during a subsequent stage in the cycle of operations to lay the lasting margin of the upper inwardly over and to secure it to the bottom of the shoe, a fastener separating mechanism having a reciprocable separating member, conduits extending between the separating mechanism and said fastener-inserting devices and adapted to receive fasteners separated by said separating member, means for operating said separating member to separate fasteners during the latter part of the subsequent stage in each cycle of operations of the machine, a source of air under pressure, a valve for connecting said source to said conduits, and a cam for opening said valve to admit air under pressure into said conduits at the beginning of said subsequent stage in each cycle of operations to move fasteners therein separated during a previous cycle of operations to said fastener-inserting devices.

39. In a machine for shaping uppers over lasts, a plurality of grippers for pulling the upper of a shoe over a last respectively at the toe end and at the opposite sides of the last in an initial stage of a cycle of power operations of the machine, a plurality of overlaying and fastener-inserting devices operable during a subsequent stage in the cycle of operations to lay the lasting margin of the upper inwardly over and to secure it to the bottom of the shoe, a fastener separating mechanism having a reciprocable separating member, conduits extending between the separating mechanism and said fastener-inserting devices and adapted to receive fasteners separated by said separating member, a reciprocating gate member interposed between said conduits and the separating mechanism, means for simultaneously operating the separating member and opening said gate member to separate fasteners and to deliver them to said conduits during the latter part of the subsequent stage in the cycle of operations of the machine and to close said gate member during the beginning of the subsequent stage in each cycle of operations, and means operated by said separating member and gate member operating means for introducing a blast of air under pressure into said conduits at the beginning of said subsequent stage in each cycle of operations to move fasteners therein separated during a previous cycle of operations to said fastener-inserting devices.

40. In a machine for shaping uppers over lasts, a plurality of grippers for pulling the upper of a shoe over a last respectively at the toe end and at the opposite sides of the last in an initial stage of a cycle of power operations of the machine, a plurality of overlaying and fastener-inserting devices operable during a subsequent stage in the cycle of operations to lay the lasting margin of the upper inwardly over and to secure it to the bottom of the shoe, a fastener separating mechanism having a reciprocable separating member, conduits extending between the separating mechanism and said fastener-inserting devices and adapted to receive fasteners separated by said separating member, a reciprocating gate member interposed between said conduits and the separating mechanism, means for simultaneously operating the separating member and opening said gate member to separate fastenings and to deliver them to said conduits during the latter part of the subsequent stage in the cycle of operations of the machine and to close said gate member during the beginning of the subsequent stage in each cycle of operations, a source of air under pressure, a valve for connecting said source to said conduits, and means operated by said separating member and gate member operating means for opening the valve to introduce a blast of air under pressure into said conduits at the beginning of said subsequent stage in each cycle of operations to move fasteners therein separated during a previous cycle of operations to said fastener-inserting devices.

41. In a machine for shaping uppers over lasts, a plurality of grippers for pulling the upper of a shoe over a last respectively at the toe end and at the opposite sides of the last in an initial stage of a cycle of power operations of the machine, a plurality of overlaying and fastener-inserting devices operable during a subsequent stage in the cycle of operations to lay the lasting margin of the upper inwardly over and to secure it to the bottom of the shoe, a fastener separating mechanism having a reciprocable separating member, conduits extending between the separating mechanism and said fastener-inserting devices and adapted to receive fasteners separated by said separating member, a reciprocating gate member interposed between said conduits and the separating mechanism, a cam for simultaneously operating the separating member and opening said gate member to separate fasteners and to deliver them to said conduits during the latter part of the subsequent stage in the cycle of operations of the machine and to close said gate member during the beginning of the subsequent stage in each cycle of operations, a source of air under pressure, a valve for connecting said source to said conduits, and means operated by said separating member and gate member operating cam for opening said valve to introduce a blast of air under pressure into said conduits at the beginning of said subsequent stage in each cycle of operations to move fasteners therein separated during a previous cycle of operations to said fastener-inserting devices.

42. In a machine for shaping uppers over lasts, a plurality of grippers for pulling an upper over a last and for thereafter holding the upper under tension, means for operating said grippers, a tip gage mounted for movement from an inoperative position remote from the toe end of a shoe in the machine to an operative position adjacent to the toe end of the shoe, and means associated with the gripper-operating mechanism for holding the tip gage in its inoperative position prior to the operation of said grippers, said last-named means being displaceable in response to the operation of said grippers to release the tip gage for movement to its operative position.

43. In a machine for shaping uppers over lasts, a plurality of grippers for pulling an upper over a last and for thereafter holding the upper under tension, means for operating said grippers, a tip gage mounted for movement under the influence of gravity from an inoperative position remote from the toe end of a shoe in the machine to an operative position adjacent to the toe end of the shoe, and means associated with the gripper-operating mechanism for holding the tip gage in its inoperative position prior to the operation of said grippers, said last-named means being displaceable in response to the operation of said grippers to release the tip gage for movement under the influence of gravity to its operative position.

44. In a machine for shaping uppers over lasts, a plurality of grippers for pulling an upper over a last and for thereafter holding the upper under tension, means for operating said grippers, a tip gage mounted for pivotal movement from an inoperative position remote from the toe end of a shoe in the machine to an operative position adjacent to the toe end of the shoe, and means associated with the gripper-operating mechanism for holding the tip gage in its inoperative position prior to the operation of said grippers, said last-named means being displaceable in response to the operation of said grippers to release the tip gage for pivotal movement to its operative position.

45. In a machine for shaping uppers over lasts, a plurality of grippers for pulling an upper over a last and for thereafter holding the upper under tension, means for operating said grippers, a tip gage mounted for pivotal movement under the influence of gravity from an inoperative position remote from the toe end of a shoe in the machine to an operative position adjacent to the toe end of the shoe, and means associated with the gripper-operating mechanism for holding the tip gage in its inoperative position prior to the operation of said grippers, said last-named means being displaceable in response to the operation of said grippers to release the tip gage for pivotal movement under the influence of gravity to its operative position.

46. In a machine for shaping uppers over lasts, a plurality of grippers for pulling an upper over a last and for thereafter holding the upper under tension, means for operating said grippers, a tip gage mounted for pivotal movement under the influence of gravity from an inoperative position remote from the toe end of a shoe in the machine to an operative position adjacent to the toe end of the shoe, a gripper-operating lever associated with one of the grippers and having an abutment portion located adjacent to said tip gage, and means operatively connected to the tip gage and adapted to be contacted by said gripper-operating lever for holding the tip gage in its inoperative position prior to the operation of said grippers, said gripper-operating lever being movable, during the operation of said grippers away from said last-named means to release the tip gage for pivotal movement under the influence of gravity to its operative position.

47. In a machine for shaping uppers over lasts, a toe gripper for pulling an upper over the toe end of a last and a pair of side grippers for pulling the upper over the opposite sides of the last in a cycle of power operations of the machine, a gripper-spreading mechanism for determining the positions of said grippers during their pulling actions, said spreader mechanism including devices for positioning the toe and side grippers, respectively, and a member mounted for movement in a direction to withdraw said positioning devices to permit collapse of said grippers subsequently to their pulling actions, mechanisms associated with said member for effecting adjustment of said devices to vary the positions of said grippers, a pair of hand levers mounted for pivotal movement about a common axis extending transversely of the machine and associated respectively with said adjusting mechanisms, a clutch associated with each of said hand levers, and spring means normally holding said clutches in disengaged position, said hand levers each being mounted for pivotal movement in a direction parallel to said common axis for engaging a clutch to connect the hand lever with its associated adjusting mechanism.

48. In a machine for shaping uppers over lasts, a toe gripper for pulling an upper over the toe end of a last and a pair of side grippers for pulling the upper over the opposite sides of the last in a cycle of power operations of the machine, a gripper-spreading mechanism for determining the positions of said grippers during their pulling actions, said spreader mechanism including devices for positioning the toe and side grippers, respectively, and a member mounted for movement in a direction to withdraw said positioning devices to permit collapse of said grippers subsequently to their pulling actions, mechanisms associated with said member for effecting adjustment of said devices to vary the positions of said grippers, a pair of hand levers mounted for pivotal movement about a common axis extending transversely of the machine and associated respectively with said adjusting mechanisms, a gear associated with each of said hand levers, a gear associated with each of said adjusting mechanisms, and spring means normally holding said gears out of engagement, said hand levers each being mounted for pivotal movement in a direction parallel to said common axis for engaging its associated gear with the gear associated with one of said adjusting mechanisms to connect the hand lever to its associated adjusting mechanism.

49. In a machine for shaping uppers over lasts, a toe gripper for pulling an upper over the toe end of a last and a pair of side grippers for pulling the upper over the opposite sides of the last in a cycle of power operations of the machine, a gripper-spreading mechanism for determining the positions of said grippers during their pulling actions, said spreader mechanism including devices for positioning the toe and side grippers, respectively, and a member mounted for movement in a direction to withdraw said positioning devices to permit collapse of said grippers subsequently to their pulling actions, an adjusting mechanism for varying the position of said toe gripper and an adjusting mechanism for varying the positions of the toe gripper and the side grippers, a pair of hand levers mounted for pivotal movement about a common axis extending transversely of the machine and associated respectively with said adjusting mechanisms, a clutch for connecting each hand lever with its associated adjusting mechanism, and spring means for normally holding said clutches in disengaged positions, said hand levers each being mounted for pivotal movement in a direction parallel to said common axis for engaging a clutch to connect the hand lever with its associated adjusting mechanism.

50. In a machine for shaping uppers over lasts, a toe gripper for pulling an upper over the toe end of a last and a pair of side grippers for pulling the upper over the opposite sides of the last in a cycle of power operations of the machine, a gripper-spreading mechanism for determining the positions of said grippers during their pulling actions, said spreader mechanism including devices for positioning the toe and side grippers, respectively, and a member mounted for movement in a direction to withdraw said positioning devices to permit collapse of said grippers subsequently to their pulling actions, an adjusting mechanism for varying the position of said toe gripper and an adjusting mechanism for varying the positions of the toe gripper and the side grippers, a pair of hand levers mounted for pivotal movement about a common axis extending transversely of the machine and associated respectively with said adjusting mechanisms, a gear connected to each hand lever, a gear connected to each adjusting mechanism, and spring means for normally holding said gears out of mesh, said hand levers each being mounted for pivotal movement in a direction parallel to said common axis for meshing the gear connected thereto with the gear connected to one of said adjusting mechanisms to connect the hand lever with its associated adjusting mechanism.

51. In a machine for shaping uppers over lasts, a pair of grippers for pulling the upper of a shoe over a last respectively at the opposite sides of the last in an initial stage of a cycle of power operations of the machine and for holding the upper under tension during a dwell period in said cycle of operations, overlaying members movable during a subsequent stage in the cycle of operations to lay the lasting margin of the upper inwardly over the bottom of the shoe at the opposite sides of the last, means for effecting movements of said grippers in directions extending lengthwise of the last during said dwell period including a pair of hand levers operatively connected, respectively, to each of the grippers, a locking device associated with each of said hand levers for holding the gripper in the position to which it is moved by the hand lever connected thereto, and means associated with said overlaying members for effecting release of said locking devices in response to movement of the overlaying members to lay the lasting margin of the upper inwardly over the shoe bottom.

52. In a machine for shaping uppers over lasts, a pair of grippers for pulling the upper of a shoe over a last respectively at the opposite sides of the last in an initial stage of a cycle of power operations of the machine and for holding the upper under tension during a dwell period in said cycle of operations, overlaying members movable during a subsequent stage in the cycle of operations to lay the lasting margin of the upper inwardly over the bottom of the shoe at the opposite sides of the last, means for effecting movements of said grippers in directions extending lengthwise of the last during said dwell period including a pair of hand levers located on one side of the machine and operatively connected respectively to each of the grippers, a locking device associated with each of said hand levers for holding the gripper in the position to which it is moved by the hand lever connected thereto, and means associated with said overlaying member for effecting release of said locking devices in response to movement of the overlaying members to lay the lasting margin of the upper inwardly over the shoe bottom.

53. In a machine for shaping uppers over lasts, a pair of grippers for pulling the upper of a shoe over a last respectively at the opposite sides of the last in an initial stage of a cycle of power operations of the machine and for holding the upper under tension during a dwell period in said cycle of operations, overlaying members movable during a subsequent stage in the cycle of operations to lay the lasting margin of the upper inwardly over the bottom of the shoe at the opposite sides of the last, means for effecting movements of said grippers in directions extending lengthwise of the last during said dwell period including a pair of hand levers, a shaft associated with each hand lever and operatively connected to one of the pair of grippers, a serrated wheel secured to each shaft, and a locking plunger associated with each of the serrated wheels, said locking plungers being arranged to be held in operative positions for engaging their associated serrated wheels by said overlaying member and to be released for movement out of engagement with their associated serrated wheels in response to the inward movement of said overlaying members.

54. In a machine for shaping uppers over lasts, a pair of grippers for pulling the upper of a shoe over a last respectively at the opposite sides of the last in an initial stage of a cycle of power operations of the machine and for holding the upper under tension during a dwell period in said cycle of operations, overlaying members movable during a subsequent stage in the cycle of operations to lay the lasting margin of the upper inwardly over the bottom of the shoe at the opposite sides of the last, means for effecting movements of said grippers in directions extending lengthwise of the last during said dwell period including a pair of hand levers located on one side of the machine, a shaft associated with each hand lever and operatively connected to one of the pair of grippers, a serrated wheel secured to each shaft, and a locking plunger associated with each of the serrated wheels, said locking plungers being arranged to be held in operative positions for engaging their associated serrated wheels by said overlaying members and to be released for movement out of engagement with their associated serrated wheels in response to the inward movements of said overlaying members.

(References on following page)

References Cited in the file of this patent

UNITED STATES PATENTS

| | | |
|---|---|---|
| 1,324,268 | Perri | Dec. 9, 1919 |
| 1,346,256 | Ricks | July 13, 1920 |
| 1,366,472 | McFeely | Jan. 25, 1921 |
| 1,426,389 | Jerram et al. | Aug. 22, 1922 |
| 1,426,390 | Jerram et al. | Aug. 22, 1922 |
| 1,430,559 | Jorgensen | Oct. 3, 1922 |
| 1,510,851 | Jerram et al. | Oct. 7, 1924 |
| 2,039,448 | Pym | May 5, 1936 |
| 2,552,793 | Kestell | May 15, 1951 |